(12) United States Patent
Ota et al.

(10) Patent No.: US 9,782,884 B2
(45) Date of Patent: Oct. 10, 2017

(54) MOTOR-POWERED APPARATUS AND METHOD OF CONTROLLING THE SAME

(71) Applicant: MAKITA CORPORATION, Anjo-shi, Aichi (JP)

(72) Inventors: Tomoyuki Ota, Anjo (JP); Hiroshi Nojiri, Anjo (JP); Takuya Kusakawa, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 24 days.

(21) Appl. No.: 14/941,990

(22) Filed: Nov. 16, 2015

(65) Prior Publication Data

US 2016/0149520 A1    May 26, 2016

(30) Foreign Application Priority Data

Nov. 26, 2014    (JP) .................................. 2014-238708

(51) Int. Cl.
*A01D 34/30* (2006.01)
*B25F 5/00* (2006.01)
*A01D 34/78* (2006.01)
*A01D 34/90* (2006.01)

(52) U.S. Cl.
CPC ............... *B25F 5/00* (2013.01); *A01D 34/78* (2013.01); *A01D 34/90* (2013.01); *A01D 2034/907* (2013.01)

(58) Field of Classification Search
CPC .................................. A01D 34/30; B25F 5/00
See application file for complete search history.

(56) References Cited

U.S. PATENT DOCUMENTS

| | | | | |
|---|---|---|---|---|
| 2005/0045354 A1* | 3/2005 | Arimura | ................. | B25B 21/00 173/219 |
| 2010/0313430 A1* | 12/2010 | Yamaoka | ............... | A01D 34/90 30/276 |
| 2012/0234566 A1* | 9/2012 | Mashiko | ................. | B25B 21/02 173/93.5 |
| 2012/0234573 A1* | 9/2012 | Suda | ...................... | B25F 5/026 173/217 |
| 2014/0165525 A1 | 6/2014 | Nagata | | |

FOREIGN PATENT DOCUMENTS

JP    2014-117267 A    6/2014

* cited by examiner

*Primary Examiner* — Shawki S Ismail
*Assistant Examiner* — Muhammad S Islam
(74) *Attorney, Agent, or Firm* — Oliff PLC

(57) ABSTRACT

A motor-powered apparatus according to one aspect of the present disclosure comprises a motor, a drive switch, a reverse switch, and a control unit. The control unit is configured to drive the motor in a reverse direction when a drive command is inputted via the drive switch after a reverse command is inputted via the reverse switch and to drive the motor in a forward direction when the drive command is inputted again via the drive switch.

14 Claims, 16 Drawing Sheets

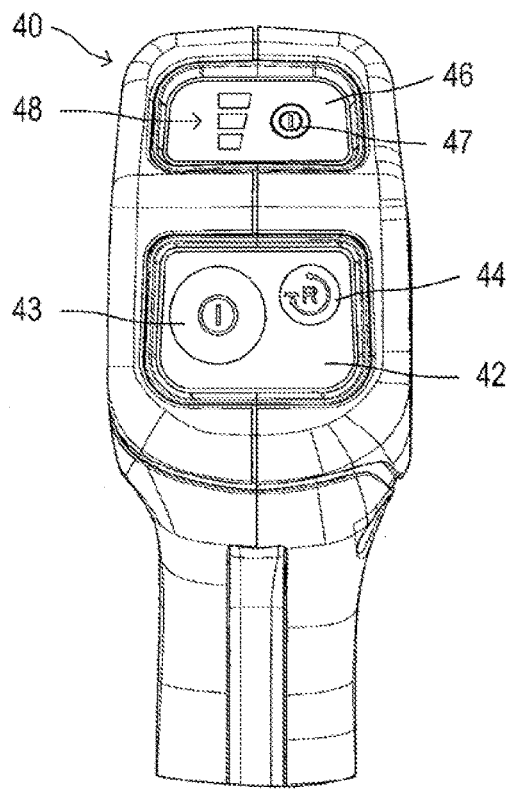

| STATES BEFORE OPERATION | OPERATION | STATES AFTER OPERATION | STATES ON DISPLAY |
|---|---|---|---|
| MAIN POWER SUPPLY: OFF | POWER-SUPPLY SW: LONG-PRESSED | MAIN POWER SUPPLY: ON / SET-SPEED | |
| MAIN POWER SUPPLY: ON | POWER-SUPPLY SW: LONG-PRESSED | MAIN POWER SUPPLY: OFF | |
| MAIN POWER SUPPLY: ON | POWER-SUPPLY SW: SHORT-PRESSED | MAIN POWER SUPPLY: ON / SPEED SWITCHED | |
| MAIN POWER SUPPLY: ON | REVERSE SWITCH OPERATED | ROTATIONAL DIRECTION REVERSED | BLINKING |

MOTOR-POWERED APPARATUS AND METHOD OF CONTROLLING THE SAME

CROSS-REFERENCE TO RELATED APPLICATIONS

This application claims the benefit of Japanese Patent Application No. 2014-238708 filed Nov. 26, 2014 in the Japan Patent Office, and the disclosure of which is incorporated herein by reference.

BACKGROUND

The present disclosure relates to a motor-powered apparatus that is powered by a motor and a method of controlling the same.

A grass mower disclosed in Japanese Unexamined Patent Application Publication No. 2014-117267 comprises a drive switch for inputting a drive command for a motor, and a forward-reverse changeover switch for switching the rotational direction of the motor between the forward direction and the reverse direction as operation switches for a user to operate.

SUMMARY

In a motor-powered apparatus like the aforementioned grass mower, after the rotational direction of the motor was switched from the forward direction to the reverse direction by operating a forward-reverse changeover switch, the motor could not be rotated in the forward direction until the forward-reverse changeover switch was operated again to switch the rotational direction of the motor from the reverse direction to the forward direction.

For this reason, the operation to switch the rotational direction of the motor from the reverse direction to the forward direction can be a nuisance for the user as regards a motor-powered apparatus, like the aforementioned grass mower, in which the rotational direction of the motor may be highly likely to be switched to the forward direction immediately after being switched to the reverse direction.

The motor of the grass mower is rotated in the reverse direction when removing grass that has tangled around a rotary blade during mowing. After removing the grass that tangled around the rotary blade, the rotational direction of the motor needs to be switched back to the forward direction. The operation of the forward-reverse changeover switch for this purpose is a nuisance for the user and may decrease work efficiency of mowing.

It is desirable that one aspect of the present disclosure can provide a motor-powered apparatus that does not require an operation to switch the rotational direction of the motor from the reverse direction to the forward direction.

A motor-powered apparatus in one aspect of the present disclosure comprises a motor, a drive switch, a reverse switch, and a control unit. The drive switch is configured to input a drive command for the motor. The reverse switch is configured to input a reverse command that switches a rotational direction of the motor from a preset forward direction to a reverse direction. The control unit is configured to drive the motor in the reverse direction when the drive command is inputted via the drive switch after the reverse command is inputted via the reverse switch and to drive the motor in the forward direction when the drive command is inputted again via the drive switch.

According to the motor-powered apparatus configured as mentioned above, the user can rotate the motor in the reverse direction, which is different from the rotational direction under normal operation (the forward direction), by operating the reverse switch and the drive switch in this order.

The user can rotate the motor in the forward direction by operating the drive switch again after rotating the motor in the reverse direction.

In brief, the rotational direction of the motor can be switched back to the forward direction simply by another operation of the drive switch in this motor-powered apparatus; thus, the user is not required to operate the reverse switch.

According to this motor-powered apparatus, a motor-powered apparatus such as the aforementioned grass mower can be used efficiently by eliminating a need for a switching operation to change the rotational direction of the motor from the reverse direction to the forward direction.

The control unit may limit a drive time of the motor during a drive of the motor in the reverse direction to be equal to or less than a predefined set time, the drive of the motor in the reverse direction taking place when the drive command is inputted via the drive switch after the reverse command is inputted via the reverse switch.

For example, as regards the grass mower, grass that tangled around the rotary blade can be removed by rotating the motor in the reverse direction; the drive time of the motor required for removing the grass may be determined by, for example, the size of the rotary blade or the rotational speed of the motor. This drive time may range from around 1 second to around 30 seconds or from around 1 second to around 10 seconds.

In the case of the grass mower, if the drive time of the motor is limited to be equal to or less than the drive time required for removing the grass when removing the grass by rotating the motor in the reverse direction, then an unnecessary drive of the motor can be reduced when the drive switch is operated for a long time.

Also, the drive of the motor in the reverse direction reduces a waste consumption of electric power in the above case, enabling an attempt for power saving on the motor-powered apparatus.

Alternatively, the control unit may drive the motor in the reverse direction, when the drive command is inputted via the drive switch after the reverse command is inputted via the reverse switch, until the input of the drive command via the drive switch is stopped.

In this case, the user can drive the motor in the reverse direction throughout the operation of the drive switch. Thus, if this technology is applied to, for example, an electric power tool for tightening a screw, then the motor of the electric power tool can be rotated in the reverse direction until the screw is removed when removing the screw by rotating the motor temporarily in the reverse direction during an operation of screw tightening by the electric power tool. Thus, such an operation can be performed efficiently.

The control unit may set the drive speed during the drive of the motor in the reverse direction equal to or less than the drive speed during the drive of the motor in the forward direction.

In this case, for example, when removing grass that tangled around the rotary blade of the grass mower, it is possible to reduce a problem of having the removed grass tangled again around the rotary blade due to the drive speed during the drive of the motor in the reverse direction, which is different from the rotational direction under normal operation, increasing higher than the drive speed during the drive of the motor in the forward direction. Also, in the electric power tool for tightening a screw, for example, it is possible to reduce a problem of damaging the screw due to an excess increase of the rotational speed of a tool bit when removing the screw.

The control unit may selectively execute one of (i) a first function and (ii) a second function in accordance with a select command inputted from outside of the motor-powered apparatus; the first function may be a function that limits the drive time during the drive of the motor in the reverse direction to be equal to or less than a predefined set time, the drive of the motor in the reverse direction taking place when the drive command is inputted via the drive switch after the reverse command is inputted via the reverse switch; the second function may be a function that drives the motor in the reverse direction, when the drive command is inputted via the drive switch after the reverse command is inputted via the reverse switch, until the input of the drive command via the drive switch is stopped.

In this case, the user can select whether to stop the motor automatically after the set time has elapsed or to stop the motor by stopping the operation of the drive switch when driving the motor in the reverse direction; thereby, the motor-powered apparatus can be used more conveniently.

A switch exclusive to selecting function or a given switch disposed on the motor-powered apparatus may be used to select the first function or the second function.

In the case of using the given switch, the control unit may switch between the first function and the second function when the given switch is operated continuously for the set time or longer.

In this case, the given switch may be used as a dual-switch that can be used for selecting function, and therefore the number of switches can be reduced.

For example, the reverse switch may be used as a given dual-switch that can be used for selecting function.

The reverse switch is used for temporarily reversing the rotational direction of the motor and may be used less frequently than the switches for setting operations of the motor-powered apparatus, such as the drive speed of the motor. In the grass mower, for example, the reverse switch may be used less frequently than a switch for setting the drive speed.

Thus, in the case of arranging the reverse switch along with a different operation switch on the same operation panel, the reverse switch may comprise a smaller operation portion than the operation portion of the different operation switch.

The motor-powered apparatus may comprise a grip portion (so-called a grip) that is configured to be held by the user of the motor-powered apparatus. In this case, the operation portion of the reverse switch may be disposed at a location where the user can operate the operation portion while holding the grip portion.

Also, in this case, when arranging the reverse switch and the different operation switch in the vicinity of the grip portion, the operation portion of the reverse switch may be arranged at a location more distant from the grip portion than the location of the operation portion of the different operation switch, so that the different operation switch can be operated more easily than the reverse switch.

Note that the different operation switch, which is disposed on the same operation panel along with the reverse switch or disposed in the vicinity of the grip portion along with the reverse switch, may be, for example, a switch for setting the drive speed of the motor.

Another aspect of the present disclosure is a method of controlling a motor-powered apparatus, the apparatus comprising a motor, a drive switch that is configured to input a drive command for the motor, and a reverse switch that is configured to input a reverse command to switch a rotational direction of the motor from a preset forward direction to a reverse direction.

The method comprises:

detecting that the reverse command is inputted via the reverse switch;

detecting that the drive command is inputted via the drive switch after detecting that the reverse command is inputted via the reverse switch;

driving the motor in the reverse direction when detecting that the drive command is inputted via the drive switch;

detecting that the drive command is inputted again via the drive switch after the motor is driven in the reverse direction; and, driving the motor in the forward direction when detecting that the drive command is inputted again via the drive switch.

According to this method, a motor-powered apparatus such as the aforementioned grass mower can be used efficiently by eliminating the operation of a switch to change the rotational direction of the motor from the reverse direction to the forward direction.

BRIEF DESCRIPTION OF THE DRAWINGS

An exemplary embodiment of the present disclosure will be described hereinafter by way of example with reference to the accompanying drawings, in which:

FIG. 3A and FIG. 3B are explanatory diagrams showing changes in operational state and changes in display on a display panel in accordance with operation of an operation panel;

DETAILED DESCRIPTION OF THE PREFERRED EMBODIMENTS

Figure 1:
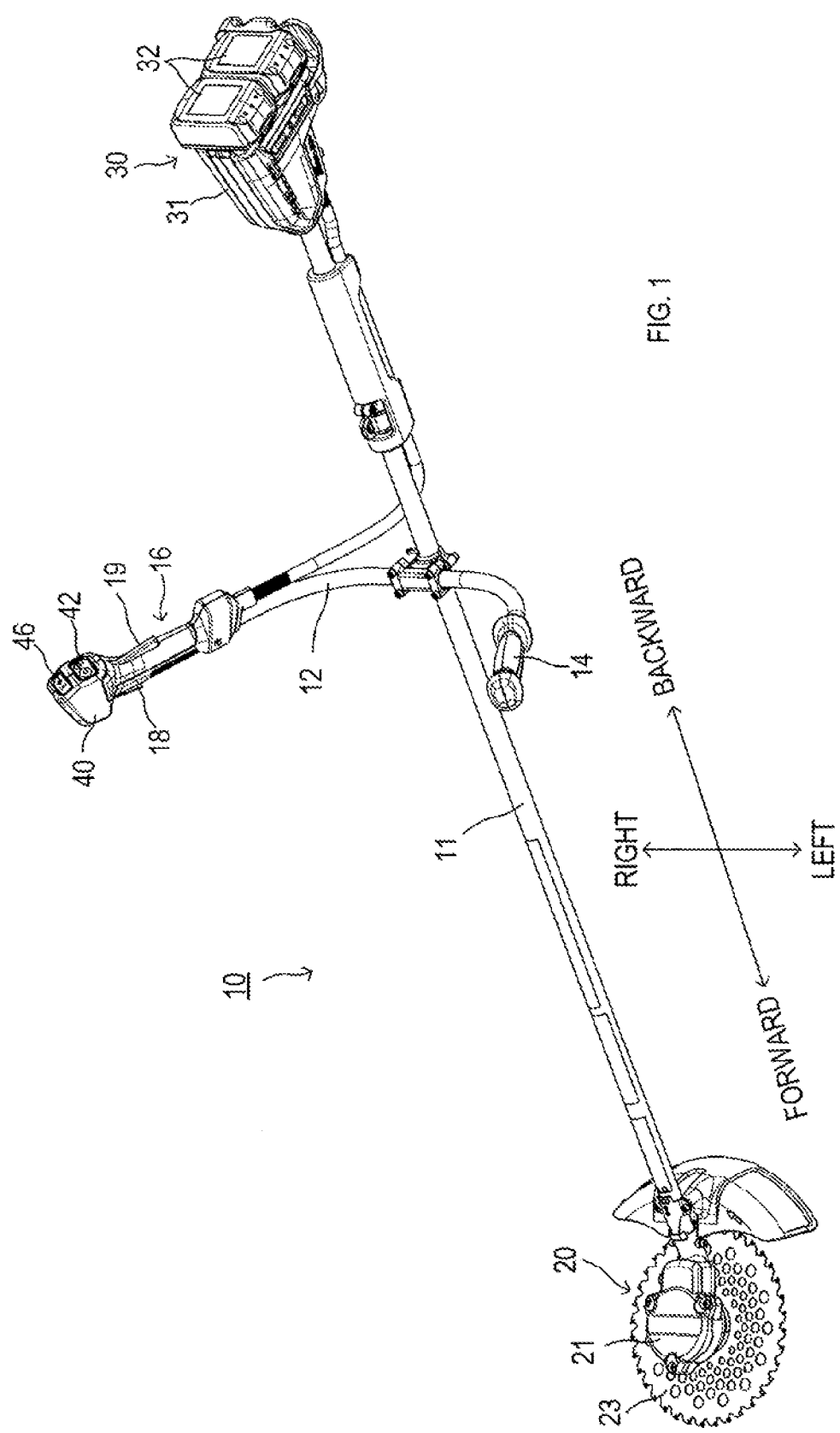
FIG. 1 is a perspective view showing an entire structure of a rechargeable grass mower of an exemplary embodiment.

As shown in FIG. 1, a grass mower 10 in the present embodiment is a rechargeable work machine that comprises a rotary blade 23 that is driven by a motor 22 (see, FIG. 4) and mows the grass by the rotation of the rotary blade 23.

The grass mower 10 comprises a supporting rod 11, the shape of which is a thin and long cylinder extending in the forward/backward direction, a cutter unit 20 that is disposed on the front-end of the supporting rod 11, and a controller unit 30 that is disposed on the back-end of the supporting rod 11.

A cutter unit 20 comprises a front-end housing 21 that is fixed on the front-end of the supporting rod 11; the front-end housing 21 houses the motor 22.

A drive shaft (not shown in the drawings) that is rotationally driven by the motor 22 protrudes downward from the front-end housing 21; the rotary blade 23 is detachably attached to the drive shaft.

Figure 4:
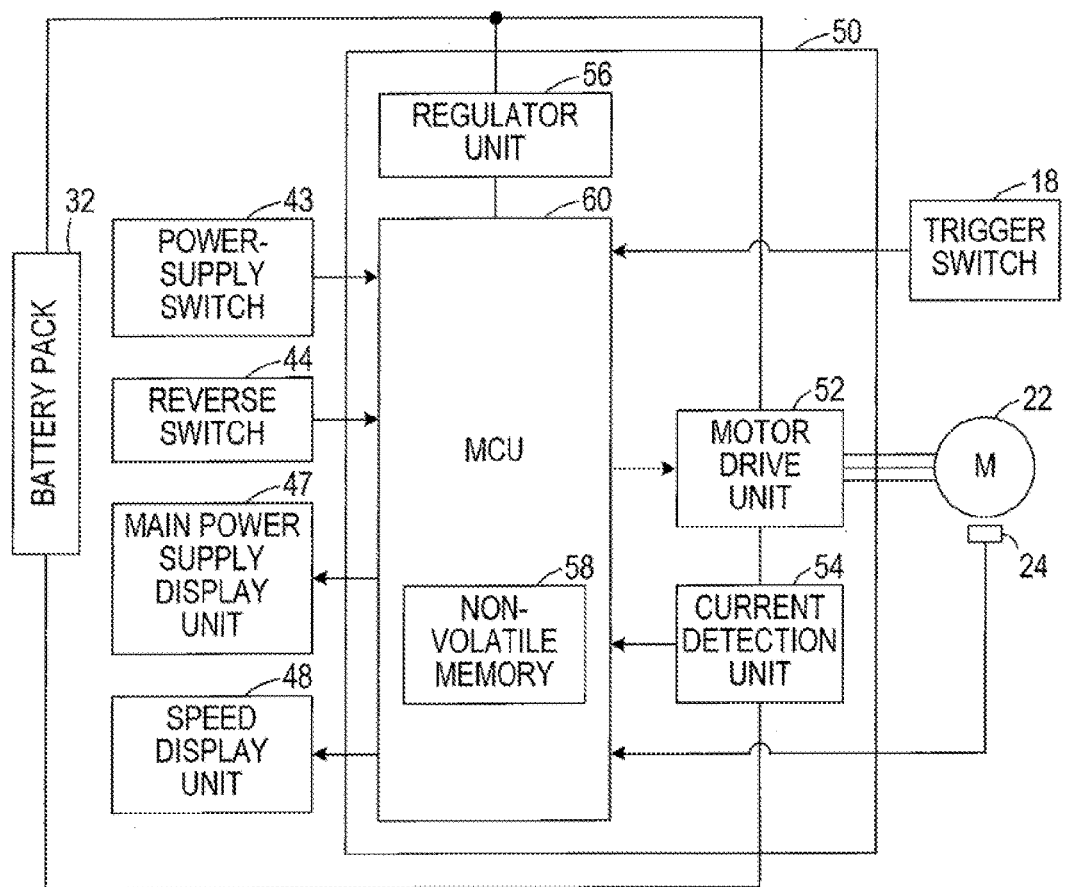
FIG. 4 is a block diagram showing electrical configuration of the grass mower.

The controller unit 30 comprises a back-end housing 31 that is fixed on the back-end of the supporting rod 11; the back-end housing 31 houses a control circuit 50 that controls drive of the motor 22 (see, FIG. 4). Note that the motor 22 is a brushless motor in the present embodiment.

Two battery packs 32 are detachably attached to the back part of the back-end housing 31 as a direct current (DC) power source to supply electric power to the grass mower 10. Each of the battery packs 32 is electrically coupled to the control circuit 50.

In the middle of the forward/backward direction of the supporting rod 11, a handle 12, which is shaped into a U-shape by curving a pipe, is fixed on the supporting rod 11 so as to be perpendicular to the central axis of the supporting rod 11.

Cylindrical grips 14 and 16, which are for a user to hold with the left and right hands, are disposed at both ends of the handle 12.

The grip 16 for the right hand comprises a trigger switch 18 as an operation switch and a trigger lock lever 19 disposed in the middle of the longitudinal direction of the grip 16.

The trigger switch 18 is disposed on the front side (the side facing the rotary blade 23) of the grip 16 and operated by the user to input the drive command for the motor 22. More specifically, the drive command for the motor 22 is inputted by the user pulling the trigger switch 18 towards the grip 16.

The trigger lock lever 19 is disposed on the back side (the side facing the controller unit 30) of the grip 16 and operated by the user to remove a state that restricts the trigger switch 18 from being pulled towards the grip 16 (locked state).

More specifically, the locked state of the trigger switch 18 is removed when the user presses the trigger lock lever 19 towards the grip 16. The user can input the drive command of the motor 22 by pulling the trigger switch 18 towards the grip 16 in this state.

An operation input unit 40, which is for the user to switch the operational state of the grass mower 10 while holding the grip 16, is disposed on the tip portion of the grip 16.

Figure 2:
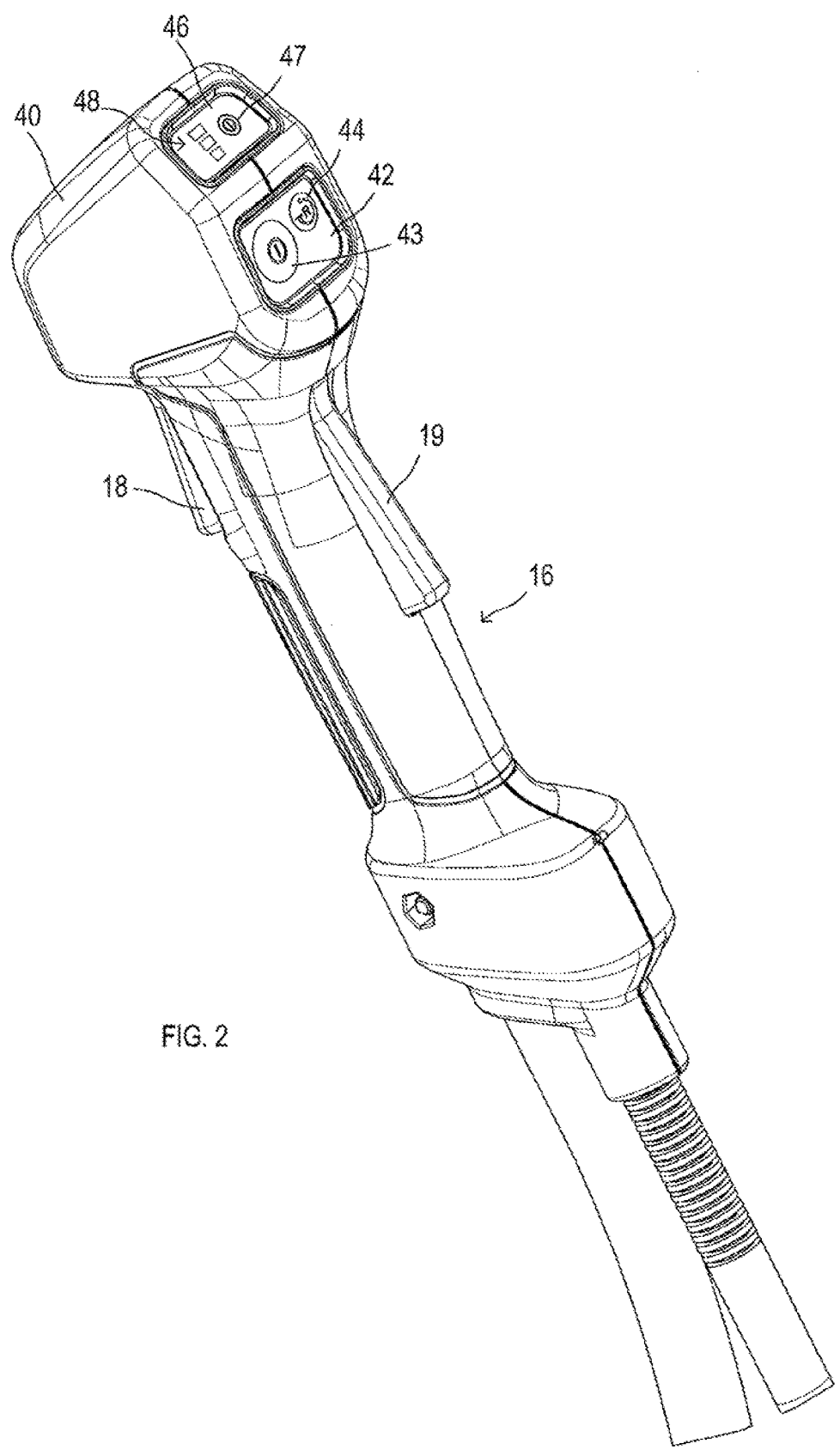
FIG. 2 is a perspective view enlarging a grip part of the grass mower.

As shown in FIG. 2, the operation input unit 40 comprises an operation panel 42 and a display panel 46.

An operation surface of the operation panel 42 is approximately parallel to the central axis of the grip 16 and is also arranged to face the back side (in other words, the side of the controller unit 30) like the trigger lock lever 19. This arrangement is for the user to easily operate the operation panel 42 with the user's thumb while holding the grip 16.

The operation panel 42 also comprises a power-supply switch 43 in the form of a push button switch that sets in the ON state when pressed. The power-supply switch 43 is a dual-operation portion for an ON/OFF operation of a main power supply and for an operation to switch a drive speed of the motor 22.

The operation panel 42 also comprises a reverse switch 44 that is for inputting a command to reverse the rotational direction of the motor 22 from the forward rotational direction. The reverse switch 44 is also a push button switch like the power-supply switch 43 that sets in the ON state when the button is pressed.

The power-supply switch 43 and the reverse switch 44 are arranged in the direction perpendicular to the central axis of the grip 16 such that the power-supply switch 43 is positioned at the left and the reverse switch 44 is positioned at the right when the tip of the grip 16 is directed upward (see, FIG. 3A).

An operation portion of the reverse switch 44 (in other words, a region available for the operation on the operation panel 42) is smaller than an operation portion of the power-supply switch 43 and is arranged to be positioned closer to the tip of the grip 16 than the power-supply switch 43 is.

This is because the reverse switch 44 is used temporarily to remove grass that tangled around the rotary blade 23 by reversing the rotation of the rotary blade 23 from the forward rotational direction for mowing (specifically, from the counterclockwise rotation to the clockwise rotation).

That is to say that, the reverse switch 44 is a sub switch that is used less frequently than a main switch, which is the power-supply switch 43. Thus, in the present embodiment, the operation portion of the reverse switch 44 is made smaller than the operation portion of the power-supply switch 43 and arranged on the grip 16 so as to be away from a portion where the user holds; thereby making it easier to operate the power-supply switch 43.

Next, a display panel 46 is disposed on the operation input unit 40 so as to be positioned closer to the tip side of the grip 16 than the operation panel 42 is, and comprises two display units 47 and 48 that are arranged in the direction perpendicular to the central axis of the grip 16.

The display unit 47 is positioned at the right when the tip of the grip 16 is directed upward. The display unit 47 is a main power supply display unit for displaying ON and OFF states of the main power supply and is lit when the main power supply is set in the ON state (see, FIG. 3A).

The display unit 48 is positioned at the left when the tip of the grip 16 is directed upward. The display unit 48 is a speed display unit for displaying the drive speed of the motor 22 that is switched by an operation of the power-supply switch 43, and comprises three display devices such as LEDs (see, FIG. 3A).

This is because the grass mower 10 in the present embodiment can switch the drive speed of the motor 22 into three modes: high-speed, medium-speed, and low-speed. The speed display unit 48 indicates the drive speed of the motor 22 by reducing the number of lit display devices in the order of the high-speed, the medium-speed, and the low-speed.

In other words, the three display devices on the speed display unit 48 are arranged vertically along the central axis of the grip 16. The speed display unit 48 displays the drive speed as follows. All of the three display devices are lit when the drive speed of the motor 22 is set to the high-speed. Two of the display devices, which are the bottom and the center devices, are lit when the drive speed of the motor 22 is set to the medium-speed. Only the bottom device is lit when the drive speed of the motor 22 is set to the low-speed.

A display surface of the display panel 46 tilts at a specified angle (for example, 15 degrees) towards the tip side of the grip 16 in relation to the operation surface of the operation panel 42. This is to make the display surface of the display panel 46 face towards the user's face when the user lifts the grass mower 10 by holding the grips 14 and 16 to mow the grass.

In other words, visibility of the display panel 46 is ensured in this embodiment by tilting the display surface of the display panel 46 in relation to the operation surface of the operation panel 42.

Next, the operation setting state of the grass mower 10, which changes depending on how the power-supply switch 43 and the reverse switch 44 disposed on the operation panel 42 are operated, and the lighting state of the main power supply display unit 47 and the speed display unit 48 on the display panel 46 will be explained referring to FIGS. 3A and 3B.

As shown in the topmost row on the table of FIG. 3B, if the power-supply switch 43 is depressed for a specified time or longer (hereinafter referred to as being long-pressed) when the main power supply is set in the OFF state, then the main power supply is set in the ON state, the grass mower 10 is brought into the operable state, and the main power supply display unit 47 is lit.

The drive speed of the motor 22 in the above case is set to the drive speed at the time when the main power supply was previously set in the OFF state; and the display device corresponding to the drive speed is lit on the speed display unit 48. Since all the display devices are lit in the topmost row on the table of FIG. 3B, it shows that the drive speed is set to the high-speed.

Meanwhile, as shown in the second row from the top on the table of FIG. 3B, if the power-supply switch 43 is long-pressed when the main power supply is set in the ON state, then the main power supply is set in the OFF state, the grass mower 10 is brought into the operation stopping state, and the display units 47 and 48 on the display panel 46 are all turned off.

Note that, in the present embodiment, switching of the main power supply from the ON state to the OFF state is automatically executed not only when the power-supply switch 43 is long-pressed but also when the trigger switch 18 is not operated for a specified time or longer.

The grass mower 10 is set in the operable state when the main power supply is set in the ON state; thus, the operation mode of the grass mower 10 is set to normal power consumption mode. The grass mower 10 is set in standby state to wait for the power-supply switch 43 being long-pressed when the main power supply is set in the OFF state; thus, the operation mode of the grass mower 10 is set to low power consumption mode, which consumes less electric power than the normal power consumption mode.

Next, as shown in the third row from the top on the table of FIG. 3B, if the power-supply switch 43 is depressed for less than the specified time (hereinafter referred to as being short-pressed) when the main power supply is set in the ON state, then the drive speed of the motor 22 is switched. This switching of the drive speed is executed in the order of high-speed, medium-speed, low-speed, and back to high-speed.

The display of the speed display unit 48 is also switched according to the switching of the drive speed; for example, two of the three display devices on the speed display unit 48 are lit when the drive speed is switched from high-speed to medium-speed as shown in FIG. 3B.

Next, as shown in the bottommost row on the table of FIG. 3B, if the reverse switch 44 is operated when the main power supply is set in the ON state, then the rotational direction setting of the motor 22 is switched from the forward rotational direction to the reverse rotational direction.

If the rotational direction of the motor 22 is reversed as mentioned above, then the main power supply display unit 47 is switched from normal lighting state to blinking state. Thus, by observing the displayed state on the main power supply display unit 47, the user can be aware of not only the ON/OFF state of the main power supply but also the direction in which the motor 22 will rotate when the trigger switch 18 is operated.

Next, such switching of the operational state of the grass mower 10 and displays on the display panel 46 based on the aforementioned operation of the operation panel 42 are executed in the control circuit 50 that controls the driving of the motor 22.

As shown in FIG. 4, the control circuit 50 comprises a motor drive unit 52 that drives the motor 22 by conducting current to the motor 22; a current detection unit 54 that detects a value of current which flows to the motor 22; and, an MCU (Micro Control Unit) 60.

The MCU 60 controls drive of the motor 22 via the motor drive unit 52 in accordance with detection signals from a rotation sensor 24 disposed in the motor 22 and from the current detection unit 54 such that the motor 22 rotates at a preset drive speed. The MCU 60 may be implemented by a known microcomputer, a combination of various separate electronic components, an ASIC (Application Specified Integrated Circuit), a programmable logic device such as a FPGA (Field Programmable Gate Array), or any combination of the above.

The MCU 60 is also coupled to the aforementioned trigger switch 18, power-supply switch 43, reverse switch 44, main power supply display unit 47, and speed display unit 48.

The MCU 60 also executes functions such as switching of the ON/OFF state of the main power supply, setting of the drive speed of the motor 22, or setting of the rotational direction of the motor 22 in accordance with how the power-supply switch 43 and the reverse switch 44 are operated. The MCU 60 drives the motor 22 when the trigger switch 18 is operated.

The MCU 60 also displays the ON/OFF state of the main power supply, the drive speed of the motor 22, and the rotational direction of the motor 22 by means of controlling the lighting state of the main power supply display unit 47 and the speed display unit 48 as shown in FIG. 3B.

The control circuit 50 comprises a regulator unit 56 that receives electric power supply from the battery packs 32 and supplies the MCU 60 with power supply voltage (direct current constant voltage) Vcc. Note that only one of the two battery packs 32 is illustrated in FIG. 4 for a simpler illustration. The two battery packs 32 may be connected to each other in series or in parallel.

The MCU 60 comprises a non-volatile memory 58 to store control condition so that a currently set control condition (such as the drive speed of the motor 22) can be sustained when the main power supply is turned OFF and power supply from the regulator unit 56 is shut off.

Next, a control process that is executed in the MCU 60 to perform functions such as drive control or control condition setting of the motor 22 will be explained referring to flowcharts of FIG. 5 to FIG. 9.

Figure 5:
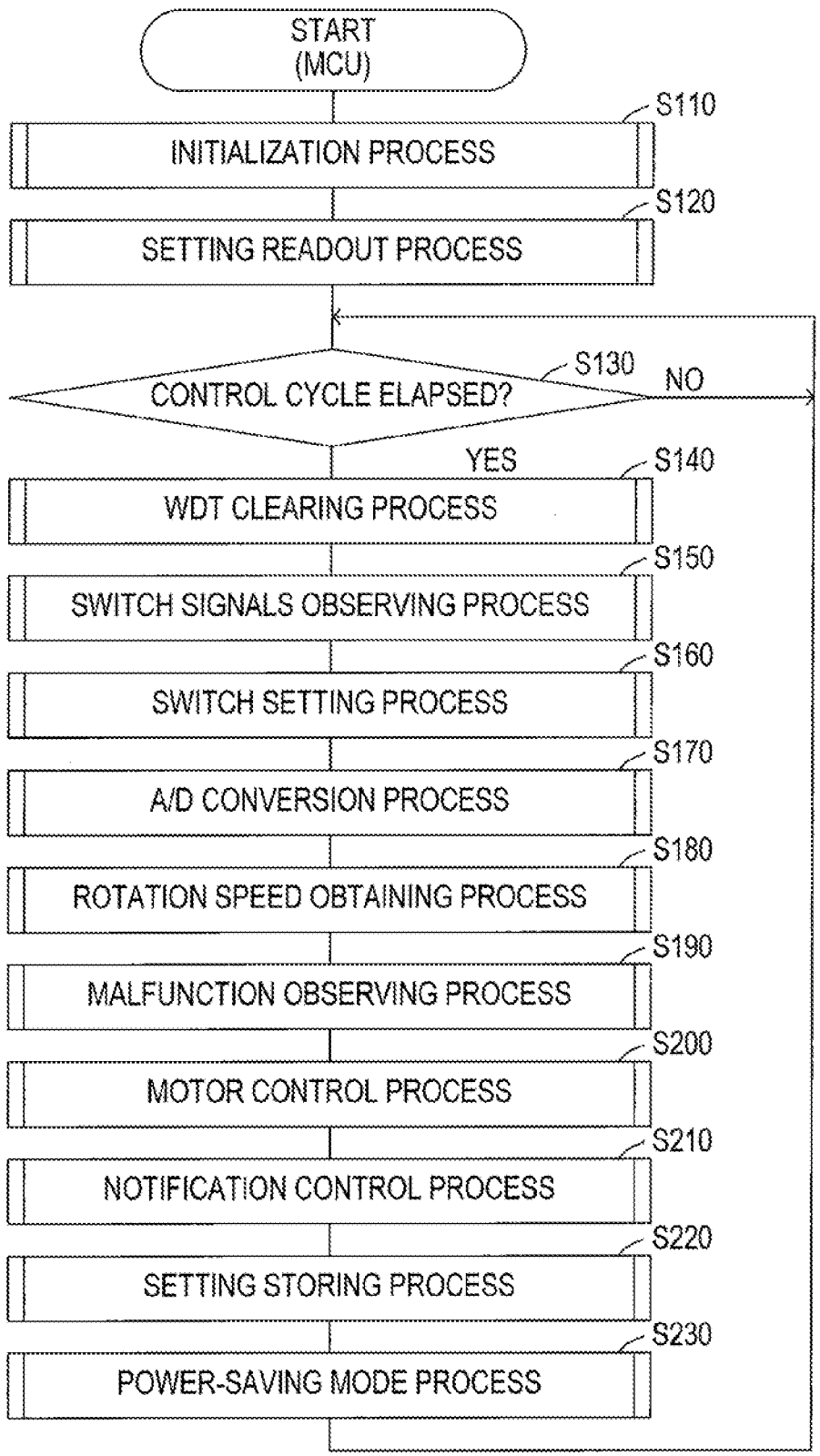
FIG. 5 is a flowchart showing a control process executed in an MCU in FIG. 3.

As shown in FIG. 5, the MCU 60 is activated by receiving power supply from the regulator unit 56 and then executes an initialization process in S110 (S refers to a step) to initialize various parameters that are to be used in the control process.

Note that the regulator unit 56 is configured to start supplying electric power to the MCU 60 by receiving a wakeup signal from an activation circuit in the MCU 60 as the power-supply switch 43 is long-pressed.

Thus, in the present embodiment, the main power supply is set in the ON state by this activation of the regulator unit 56; and the operation mode of the grass mower 10 is set to the normal power consumption mode, which enables the normal operation, as the MCU 60 starts the control process.

In the following S120, a setting readout process is executed; the setting readout process is to read out the control condition such as the drive speed of the motor 22 from the non-volatile memory 58. It is then determined in the following S130 whether a specified control cycle has elapsed.

If it is determined in S130 that the specified control cycle has not elapsed, then the process in S130 is executed again to wait for the specified control cycle to elapse; if it is determined that the specified control cycle has elapsed, then processes from S140 onward are executed. In brief, the MCU 60 periodically executes the processes from S140 onward in a specified control cycle.

In S140, a WTD clearing process to clear a watchdog timer (WDT) is executed. And in the following S150, signals from the trigger switch 18, the power-supply switch 43, and the reverse switch 44 (switch signals) are observed.

In S160, a switch setting process is executed; the switch setting process is to set the ON/OFF state of the main power supply, the drive speed of the motor 22, and necessity or unnecessity of reverse rotation of the motor 22 in accordance with the switch signals from the power-supply switch 43 and the reverse switch 44 observed in S150.

Next in S170, an A/D conversion process is executed; the A/D conversion process is to perform A/D conversion of the value of the current detected by the current detection unit 54 and a value of the battery voltage supplied from the battery packs 32; and to take in the converted values.

In S180, a rotation speed obtaining process is executed; the rotation speed obtaining process is to take in the detection signals from the rotation sensor 24 disposed in the motor 22, and to obtain rotation speed of the motor 22.

In the following S190, a malfunction observing process is executed; the malfunction observing process is to observe various malfunctions such as a battery voltage drop and an abnormal rotation of the motor 22 based on the outcome of A/D conversion performed in S170, the rotation speed of the motor 22 obtained in S180, or the like.

Next, it is determined in S200 whether the trigger switch 18 is being operated. If the trigger switch 18 is operated, then a motor control process to drive the motor 22 at a preset drive speed is executed.

In S210, a notification control process is executed; the notification control process is to notify the user, via the main power supply display unit 47 and the speed display unit 48, of the ON/OFF state of the main power supply and control conditions such as the drive speed. In the following S220, a setting storing process is executed, the setting storing process is to store the control conditions, such as the drive speed, into the non-volatile memory 58.

In the following S230, a power-saving mode process is executed; the power-saving mode process is to shut off power supply from the regulator unit 56 to the MCU 60 itself, or to bring the MCU 60 into a sleep state when the power-supply switch 43 is long-pressed and the main power supply is switched to be in the OFF state, or when the trigger switch 18 is not operated for a specified time or longer.

After executing this process of S230, the control process proceeds to S130 again and the aforementioned processes from S130 onward are executed again.

Note that the grass mower 10 is set in the operation stopping state when the MCU 60 is brought into the sleep state in the process of S230, and thus the consumed electric power is approximately zero; accordingly, the operation mode of the grass mower 10 is shifted from the normal power consumption mode to the low power consumption mode.

Of the aforementioned series of processes, the switch setting process (S160), the notification control process (S210), the motor control process (S200), and the power-saving mode process (S230) will be explained hereinafter in detail.

Figure 6:
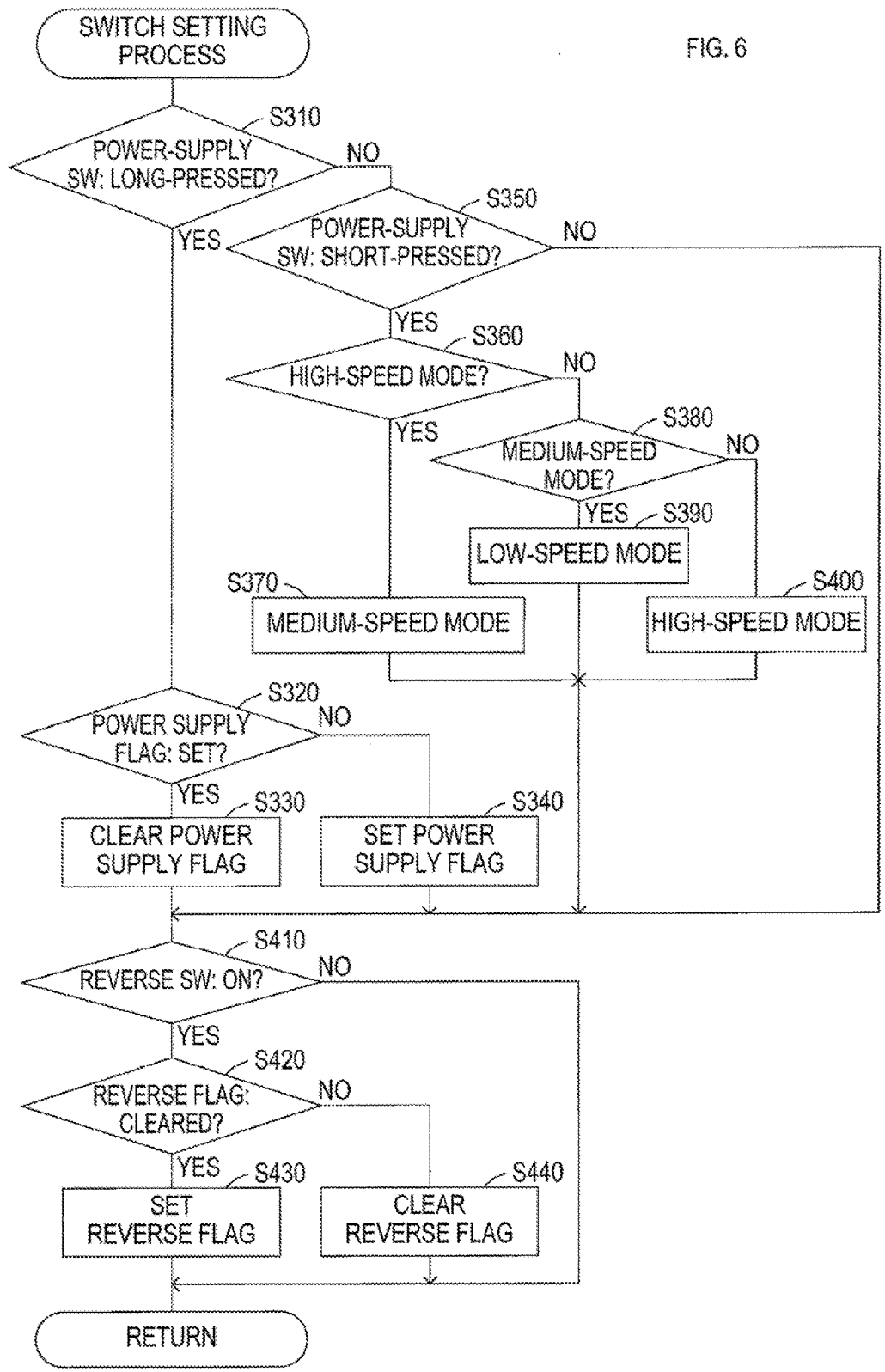
FIG. 6 is a flowchart showing a switch setting process executed in S160 in FIG. 5.

In the switch setting process as shown in FIG. 6, it is first determined in S310 whether the power-supply switch 43 is long-pressed. If the power-supply switch 43 is long-pressed, then the switch setting process proceeds to S320 to determine whether a power supply flag is set.

The power supply flag is a flag that is set when the main power supply is set in the ON state and the operation mode of the grass mower 10 is set to the normal power consumption mode.

If it is determined in S320 that the power supply flag is set, then the switch setting process proceeds to S410 after clearing the power supply flag in S330; and if it is determined in S320 that the power supply flag is cleared, then the switch setting process proceeds to S410 after setting the power supply flag in S340.

Meanwhile, if it is determined in S310 that the power-supply switch 43 is not long-pressed, then the switch setting process proceeds to S350 to determine whether the power-supply switch 43 is short-pressed; and if the power-supply switch 43 is not short-pressed, then the switch setting process proceeds to S410.

Next, if it is determined in S350 that the power-supply switch 43 is short-pressed, then the switch setting process proceeds to S360 to determine whether the operation mode currently set for the motor 22 is the high-speed mode (in other words, whether the drive speed of the motor 22 is set to high-speed).

If it is determined in S360 that the operation mode of the motor 22 is set to the high-speed mode, then the switch setting process proceeds to S370 to set the drive speed of the motor 22 to the medium-speed by changing the operation mode of the motor 22 to the medium-speed mode, and then proceeds to S410.

If it is determined in S360 that the operation mode of the motor 22 is not set to the high-speed mode, then the switch setting process proceeds to S380 to determine whether the operation mode currently set for the motor 22 is the medium-speed mode (in other words, whether the drive speed of the motor 22 is medium-speed).

If it is determined in S380 that the operation mode of the motor 22 is set to the medium-speed mode, then the switch setting process proceeds to S390 to set the drive speed of the motor 22 to low-speed by changing the operation mode of the motor 22 to the low-speed mode, and then proceeds to S410.

If it is determined in S380 that the operation mode of the motor 22 is not set to the medium-speed mode, then the operation mode of the motor 22 is currently set to the low-speed mode; thus, the switch setting process proceeds to S400 to set the drive speed of the motor 22 to the high-speed by changing the operation mode of the motor 22 to the high-speed mode, and proceeds to S410.

As explained above, switching of the ON/OFF state of the power supply flag (in other words, the main power supply) and setting of the operation mode of the motor 22 (in other words, the drive speed) are performed from S310 to S400 in accordance with how the power-supply switch 43 is operated (long-pressed/short-pressed).

Next, it is determined in S410 whether the reverse switch 44 is operated and set in the ON state. If the reverse switch 44 is not set in the ON state (that is, if the reverse switch 44 is not operated), then the switch setting process is ended.

If the reverse switch 44 is operated and set in the ON state, then the switch setting process proceeds to S420 to determine whether a reverse flag is cleared.

The reverse flag is a flag that gives an instruction whether to rotate the motor 22 in the forward direction for mowing the grass, or in the reverse direction for removing grass that tangled around the rotary blade 23. An instruction is given to reversely rotate the motor 22 when the reverse flag is set.

If it is determined in S420 that the reverse flag is cleared, then the switch setting process proceeds to S430 to set the reverse flag; the switch setting process is then ended.

If it is determined in S420 that the reverse flag is not cleared, then the switch setting process proceeds to S440 to clear the reverse flag; the switch setting process is then ended.

Figure 7:
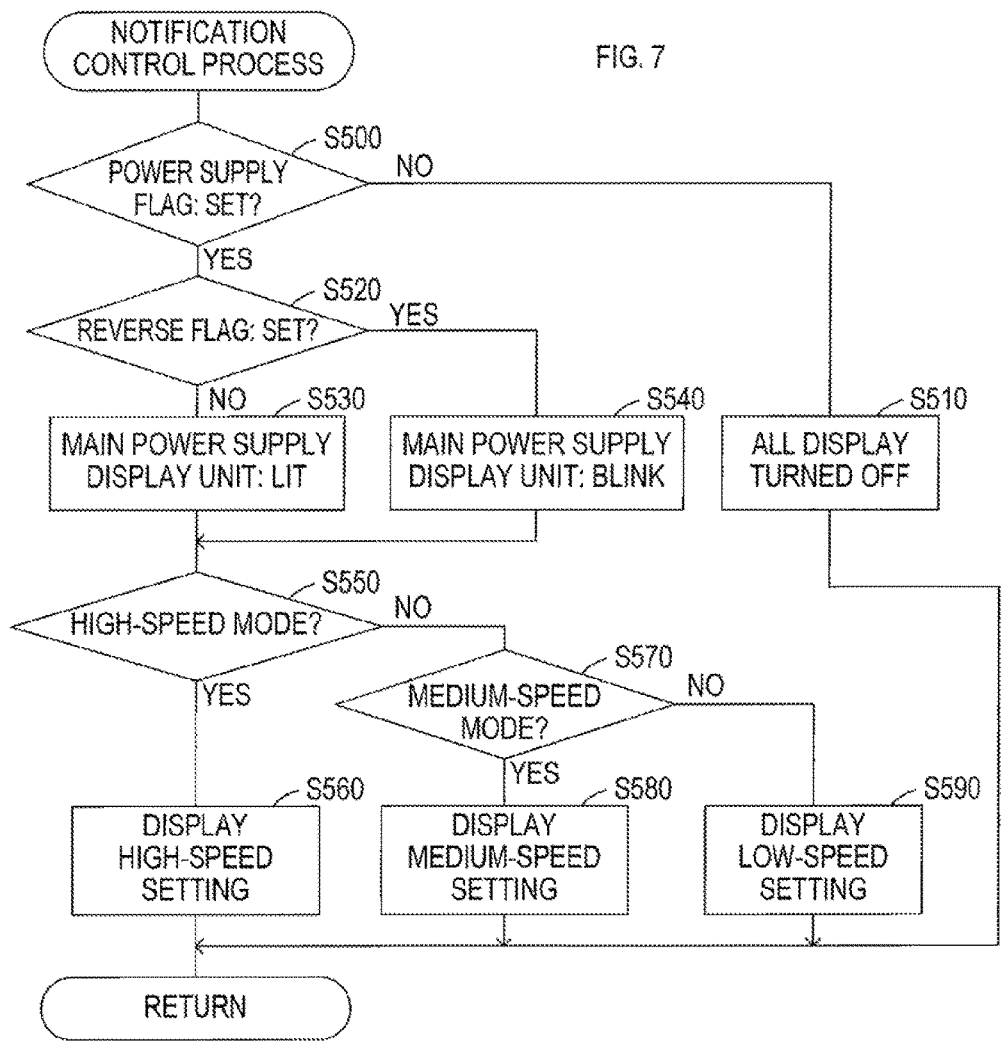
FIG. 7 is a flowchart showing a notification control process executed in S210 in FIG. 5.

Next, in the notification control process as shown in FIG. 7, it is determined first in S500 whether the power supply flag is set. If the power supply flag is not set, then the display units 47 and 48 on the display panel 46 are all turned off in S510 and the notification control process is ended.

This process enables the user to be aware that the grass mower 10 is set in the operation stopping state (in other words, in the low power consumption mode) from the state of the display panel 46.

Next, if it is determined in S500 that the power supply flag is set, then the notification control process proceeds to S520 to determine whether the reverse flag is set.

If the reverse flag is not set, then the notification control process proceeds to S530 and the main power supply display unit 47 is lit to notify that the main power supply of the grass mower 10 is set in the ON state (in other words, that the grass mower 10 is capable of normal operation) and that the rotational direction of the motor 22 (thus, of the rotary blade 23) is the forward direction which enables grass mowing; the notification control process then proceeds to S550.

If it is determined in S520 that the reverse flag is set, then the notification control process proceeds to S540 and the main power supply display unit 47 is made to blink in a specified cycle to notify that the main power supply of the grass mower 10 is set in the ON state, and that the rotational direction of the motor 22 (thus, of the rotary blade 23) is the reverse direction; the notification control process then proceeds to S550.

Next, it is determined in S550 whether the operation mode of the motor 22 is set to the high-speed mode. If the operation mode of the motor 22 is set to the high-speed mode, then the notification control process proceeds to S560 and all of the three display devices of the speed display unit 48 are lit to notify that the drive speed of the motor 22 is set to the high-speed; the notification control process is then ended.

If it is determined in S550 that the operation mode of the motor 22 is not set to the high-speed mode, then the notification control process proceeds to S570 to determine whether the operation mode of the motor 22 is set to the medium-speed mode.

If the operation mode of the motor 22 is set to the medium-speed mode, then the notification control process proceeds to S580 and two of the three display devices of the speed display unit 48 are lit to notify that the drive speed of the motor 22 is set to the medium-speed; the notification control process is then ended.

If it is determined in S570 that the operation mode of the motor 22 is not set to the medium-speed mode, then the notification control process proceeds to S590. The operation mode currently set for the motor 22 is the low-speed mode in S590; thus, one of the three display devices of the speed display unit 48 is lit to notify that the drive speed of the motor 22 is set to the low-speed, and the notification control process is then ended.

In the notification control process, the ON/OFF state of the main power supply, the set state of the drive speed of the motor 22, and the set state of a reverse rotation drive of the motor 22 are notified by switching the displayed state of the main power supply display unit 47 and the speed display unit 48 as mentioned above. Thus, the user can be easily aware of each of these states.

Figure 8:
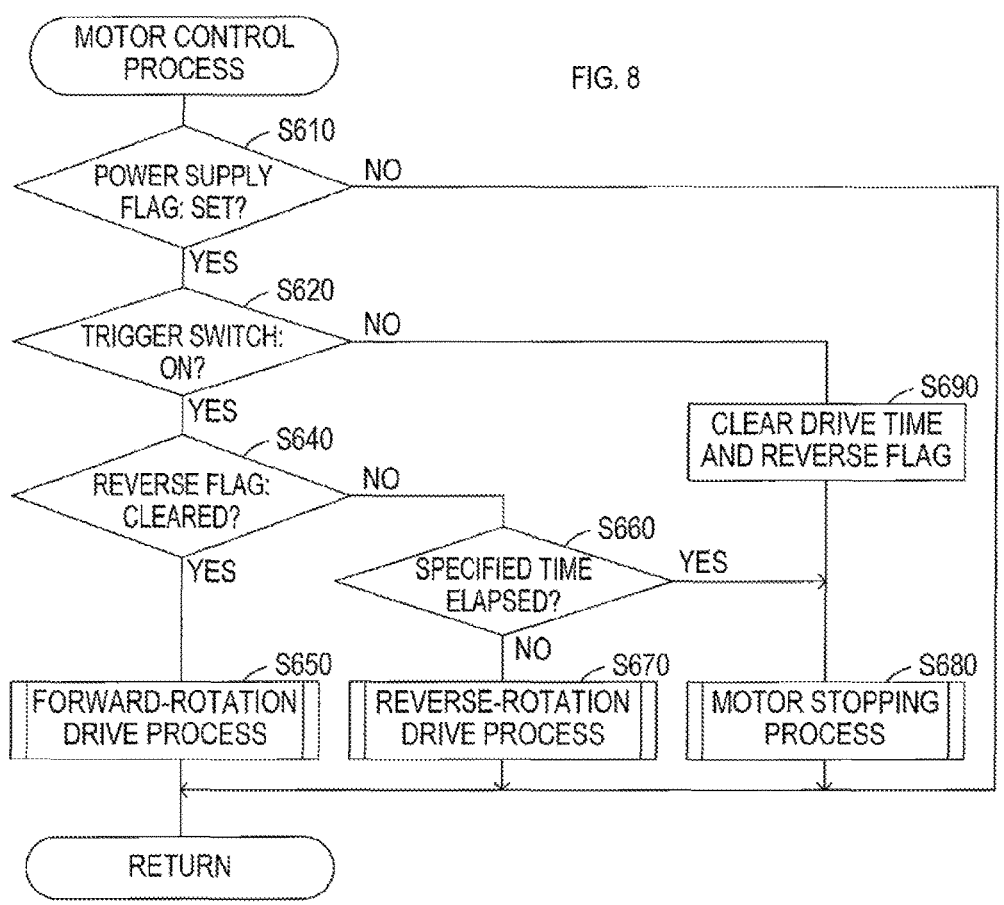
FIG. 8 is a flowchart showing a motor control process executed in S200 in FIG. 5.

Next, in the motor control process as shown in FIG. 8, it is first determined in S610 whether the power supply flag is set. If the power supply flag is not set, then it is not necessary to control the drive of the motor 22; thus, the motor control process is immediately ended.

Meanwhile, if it is determined in S610 that the power supply flag is set, then the motor control process proceeds to S620 to determine whether the trigger switch 18 is set in the ON state.

If the trigger switch is set in the ON state, then it is determined in S640 whether the reverse flag is cleared.

If it is determined in S640 that the reverse flag is cleared, then the motor control process proceeds to S650 to execute a forward-rotation drive process, which is to rotate the motor 22 in the forward direction at a currently set drive speed (high-speed, medium-speed, or low-speed), and the motor control process is then ended.

If it is determined in S640 that the reverse flag is not cleared (in other words, that the reverse flag is set), then the motor control process proceeds to S660 to determine whether the execution time of a reverse-rotation drive process, which is executed in the following S670 (that is, the drive time of the motor 22 in the reverse direction), has reached a specified time.

If it is determined in S660 that the specified time has not elapsed since the execution of the reverse-rotation drive process was started, then the motor control process proceeds to S670 to execute the reverse-rotation drive process that rotates the motor 22 in the reverse direction; the motor control process is then ended.

The drive time of the motor 22 in the reverse direction is measured in the reverse-rotation drive process, and the measured time is used in S660 to determine whether the execution time of the reverse-rotation drive process has reached the specified time.

Since the purpose of rotating the motor 22 in the reverse direction in the reverse-rotation drive process is to remove grass that tangled around the rotary blade 23, the drive speed of the motor 22 for such a purpose may be any speed as long as the grass can be removed; the drive speed may be a preset constant speed, or drive speeds for reverse rotation that are individually set to correspond to each of the high-speed mode, medium-speed mode, and low-speed mode.

Note that this drive speed of reverse rotation may be set equal to or lower than the drive speed of forward rotation of the motor 22, considering that the grass removed from the rotary blade 23 may tangle around the rotary blade 23 in the reverse direction if this drive speed of reverse rotation is higher than the drive speed of forward rotation of the motor 22.

If it is determined in S660 that the specified time has elapsed since the execution of the reverse-rotation drive process was started, then the motor control process proceeds to S680. The motor stopping process is executed in S680; the motor stopping process is to stop the drive of the motor 22. The motor control process is then ended.

If it is determined in S620 that the trigger switch 18 is not set in the ON state, then the motor control process proceeds to S690 and the drive time of the motor 22 in the reverse direction, which is measured in the reverse-rotation drive process, is cleared; and the reverse flag is cleared as well. After executing the process of S690, the motor control process proceeds to S680 to stop the drive of the motor 22; and the motor control process is ended.

As mentioned above, when the trigger switch 18 is operated in the motor control process, the motor 22 is driven in accordance with the control condition that is set in the switch setting process shown in FIG. 6.

Thus, the user can rotate the motor 22 (thus, the rotary blade 23) at a desired drive speed and mow the grass by operating the trigger switch 18.

The user can reversely rotate the motor 22 (thus, the rotary blade 23) by operating the reverse switch 44 and remove grass that tangled around the rotary blade 23; the user can also stop the operation of the grass mower 10 by operating the power-supply switch 43.

Since the time for reversely rotating the motor 22 is limited to the specified time by the determination process in S660, the user is inhibited from mowing grass with the reverse rotation. Moreover, unnecessary electric power consumption by the reverse rotation of the motor 22 can be reduced.

The specified time may be set to a time required for reversely rotating the motor 22 to remove grass that tangled around the rotary blade 23. To be more specific, the required time may be set, for example, from around 1 second to around 30 seconds, although the required time differs depends on the size of the rotary blade 23, the drive speed of reverse rotation of the motor 22, etc.

Figure 9:
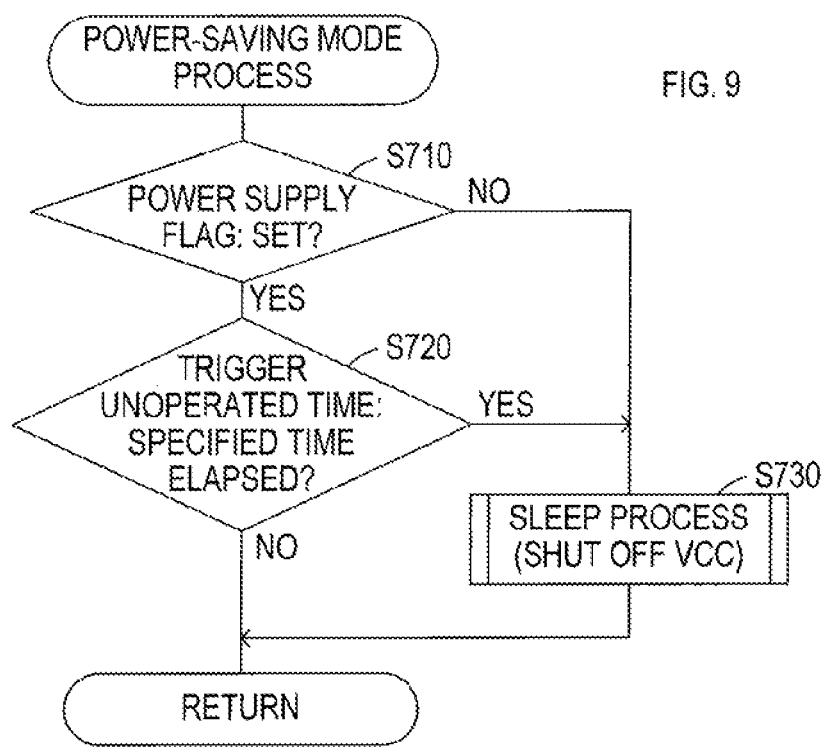
FIG. 9 is a flowchart showing a power-saving mode process executed in S230 in FIG. 5.

Next, in the power-saving mode process as shown in FIG. 9, it is first determined in S710 whether the power supply flag is set. If the power supply flag is set, then the power-saving mode process proceeds to S720.

It is determined in S720 whether a time, during which the trigger switch 18 is not operated (unoperated time), has reached a preset specified time; if the unoperated time has not reached the specified time, then the power-saving mode process is ended.

Meanwhile, if it is determined in S720 that the unoperated time of the trigger switch 18 has reached the specified time, or if it is determined in S710 that the power supply flag is not set, then the power-saving mode process proceeds to S730.

In S730, a sleep process is executed by stopping supply of the power supply voltage Vcc from the regulator unit 56 to the MCU 60; the sleep process is to bring the MCU 60 itself into the low power consumption mode state.

The execution of this sleep process makes the MCU 60 stop operating and brings the grass mower 10 into the operation stopping state.

As explained hereinbefore, the reverse switch 44 in the grass mower 10 in the present embodiment is configured as a push button switch that sets in the ON state when depressed.

Every time the reverse switch 44 is operated (depressed) and set in the ON state, the reverse flag that indicates the rotational direction of the motor 22 is switched to the set state or the cleared state (S410 to S440).

Since the motor 22 is driven in the reverse direction in the reverse-rotation drive process in S670 when the reverse flag is in the set state, the user can reversely rotate the rotary blade 23 and remove grass that tangled around the rotary blade 23 by operating the trigger switch 18 (in other words, the drive switch of the motor 22) after operating the reverse switch 44.

Since the drive time during reverse rotation of the motor 22 is limited to the preset specified time or less by the process in S660, the motor 22 stops automatically when the specified time has passed since the motor 22 was started to be driven in the reverse direction even if the user keeps operating the trigger switch 18.

Thus, unnecessary drive of the motor 22 can be reduced and thereby unnecessary electric power consumption can be reduced when reversely rotating the motor 22 to remove grass that tangled around the rotary blade 23.

If the user stops operating the trigger switch 18 after reversely rotating the motor 22, then the reverse flag is cleared in the process of S690. Thus, the motor 22 rotates in the forward direction when the user operates the trigger switch 18 next.

As a result, the user can restart mowing grass without operating the reverse switch 44 to switch the rotational direction of the motor 22 after reversely rotating the motor 22 to remove grass that tangled around the rotary blade 23; therefore, grass mowing can be performed efficiently.

In the present embodiment, the control circuit 50 corresponds to one example of a control unit of the present disclosure, and the trigger switch 18 corresponds to one example of a drive switch of the present disclosure.

One embodiment of the present disclosure is explained hereinbefore; however, the present disclosure is not limited to the embodiment as explained above and may be carried out in various modes within the scope of the spirit of the present disclosure.

For example, in the aforementioned embodiment, it is explained that the drive time during the drive of the motor 22 in the reverse direction is limited to a specified time (for example, 1 to 30 seconds) or less.

In contrast to this, when the trigger switch 18 is operated and the drive of the motor 22 in the reverse direction is started, such drive of the motor 22 in the reverse direction may be continued until the trigger switch 18 is no longer operated (in other words, until the trigger switch 18 is set in the OFF state).

In this case, the motor 22 reversely rotates in accordance with a command from the user that is inputted via the trigger switch 18; thus, the usability of the grass mower 10 can be improved when the user desires to reversely rotate the motor 22 (thus, the rotary blade 23) for a longer time.

Also in this case, the grass mower may be configured such that the user can select, by a switching operation, between a function to limit the drive time of the motor 22 in the reverse direction to the specified time or less, and a function to execute the drive of the motor 22 in the reverse direction while the trigger switch 18 is operated and the drive command is inputted.

Hereinafter, various embodiments of a grass mower that enables selection of operation (function) during the drive of the motor 22 in the reverse direction as described above will be explained as a modification of the aforementioned embodiment.

First Modification

Figure 10:
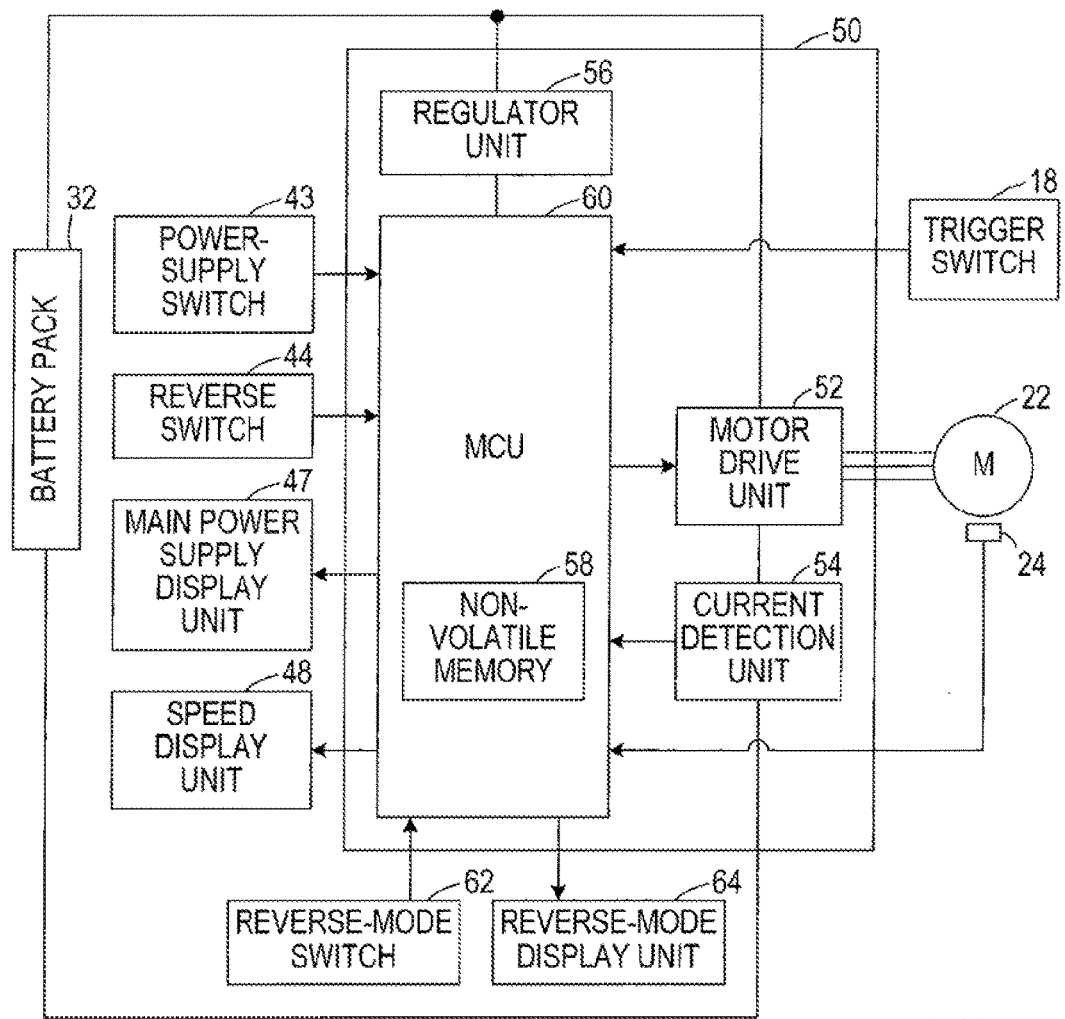
FIG. 10 is a block diagram showing an electrical configuration of a grass mower in a first modification.

A grass mower of the first modification is configured approximately the same as that of the grass mower 10 of the aforementioned embodiment, but it is different from the grass mower 10 of the aforementioned embodiment in that it comprises a reverse-mode switch 62 and a reverse-mode display unit 64 as shown in FIG. 10.

The reverse-mode switch 62 is a switch for the user to externally operate to select whether to limit the drive time during the drive of the motor 22 in the reverse direction. An operation portion of such a switch may be disposed on the operation panel 42 along with, for example, the power-supply switch 43 and the reverse switch 44.

The reverse-mode display unit 64 is a unit to display the operation during the drive of the motor 22 in the reverse direction, which is selected via the reverse-mode switch 62; a display device included in this reverse-mode display unit 64 may be disposed on the display panel 46 along with, for example, the main power supply display unit 47 and the speed display unit 48.

A control process executed in the MCU 60 is basically the same as that of the aforementioned embodiment; however, the switch setting process, the notification control process, and the motor control process are partially different from those of the aforementioned embodiment.

Such differences from the aforementioned embodiment in each of these processes will be explained hereinafter.

Figure 11:
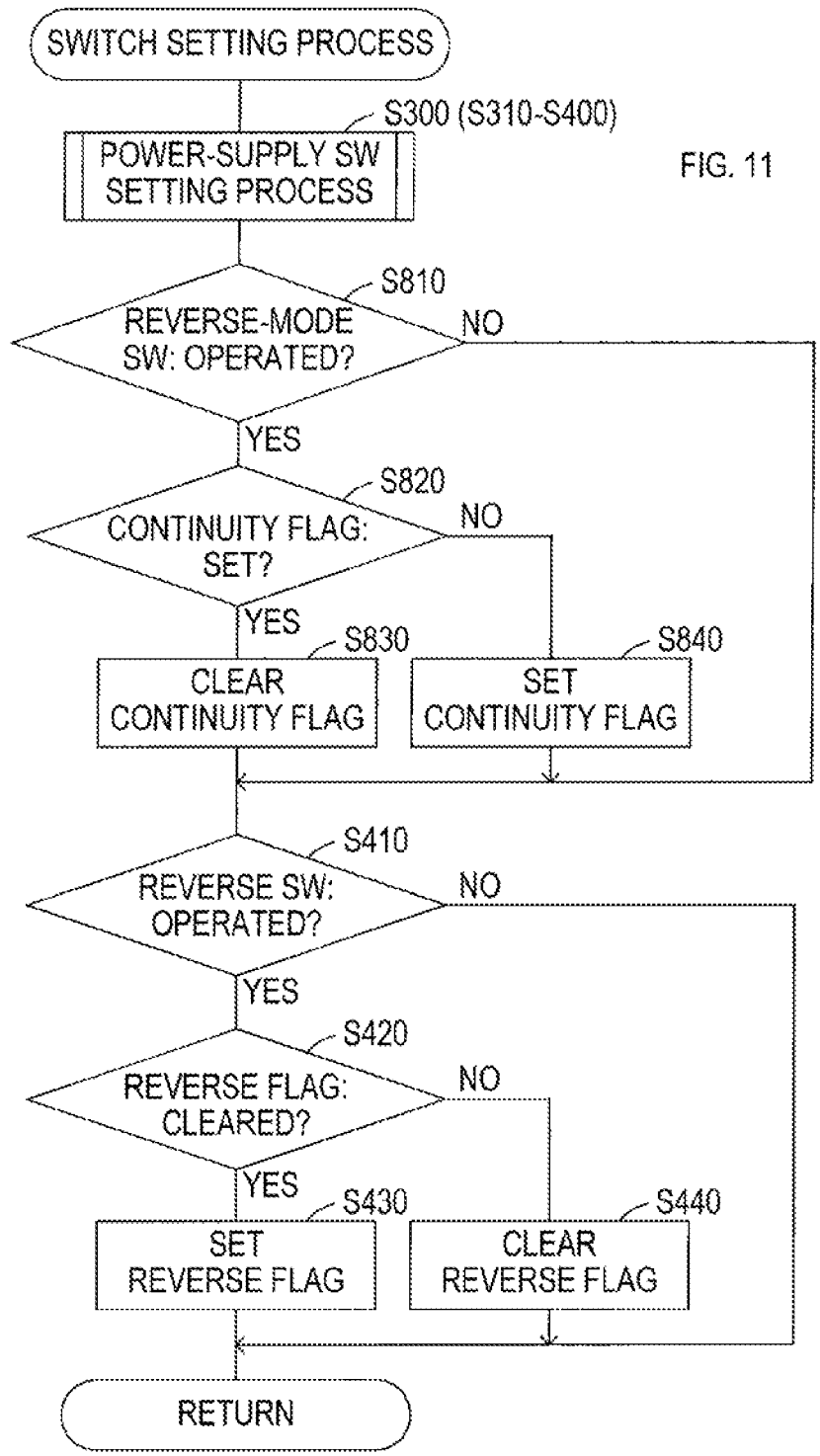
FIG. 11 is a flowchart showing a switch setting process of the first modification.

In the switch setting process of the first modification as shown in FIG. 11, the power-supply switch setting process, which is accomplished by the process steps from S310 to S400 as shown in FIG. 6, is executed in S300; the process then proceeds to S810 to determine whether the reverse-mode switch 62 is operated.

If the reverse-mode switch 62 is not operated, then the switch setting process proceeds to S410; after processes from S410 onward are executed in the same procedure as in the aforementioned embodiment, the switch setting process is ended.

Meanwhile, if it is determined in S810 that the reverse-mode switch 62 is operated, then the switch setting process proceeds to S820 to determine whether a continuity flag is currently set.

The continuity flag is a flag that indicates whether to drive the motor 22 until the trigger switch is no longer operated or to limit the drive time of the motor 22 during the drive of the motor 22 in the reverse direction.

In the first modification, if the continuity flag is set, then the drive of the motor 22 is continued; if the continuity flag is cleared, then the drive time of the motor 22 is limited.

Next, if it is determined in S820 that the continuity flag is set, then the switch setting process proceeds to S410 after the continuity flag is cleared in S830. Conversely, if it is determined in S820 that the continuity flag is not set, then the switch setting process proceeds to S410 after the continuity flag is set in S840.

Thus, according to the switch setting process in the first modification, not only the power supply flag and the reverse flag are set in accordance with a command from the user like the aforementioned embodiment, but also the continuity flag is set in accordance with a command from the reverse-mode switch 62.

Figure 12:
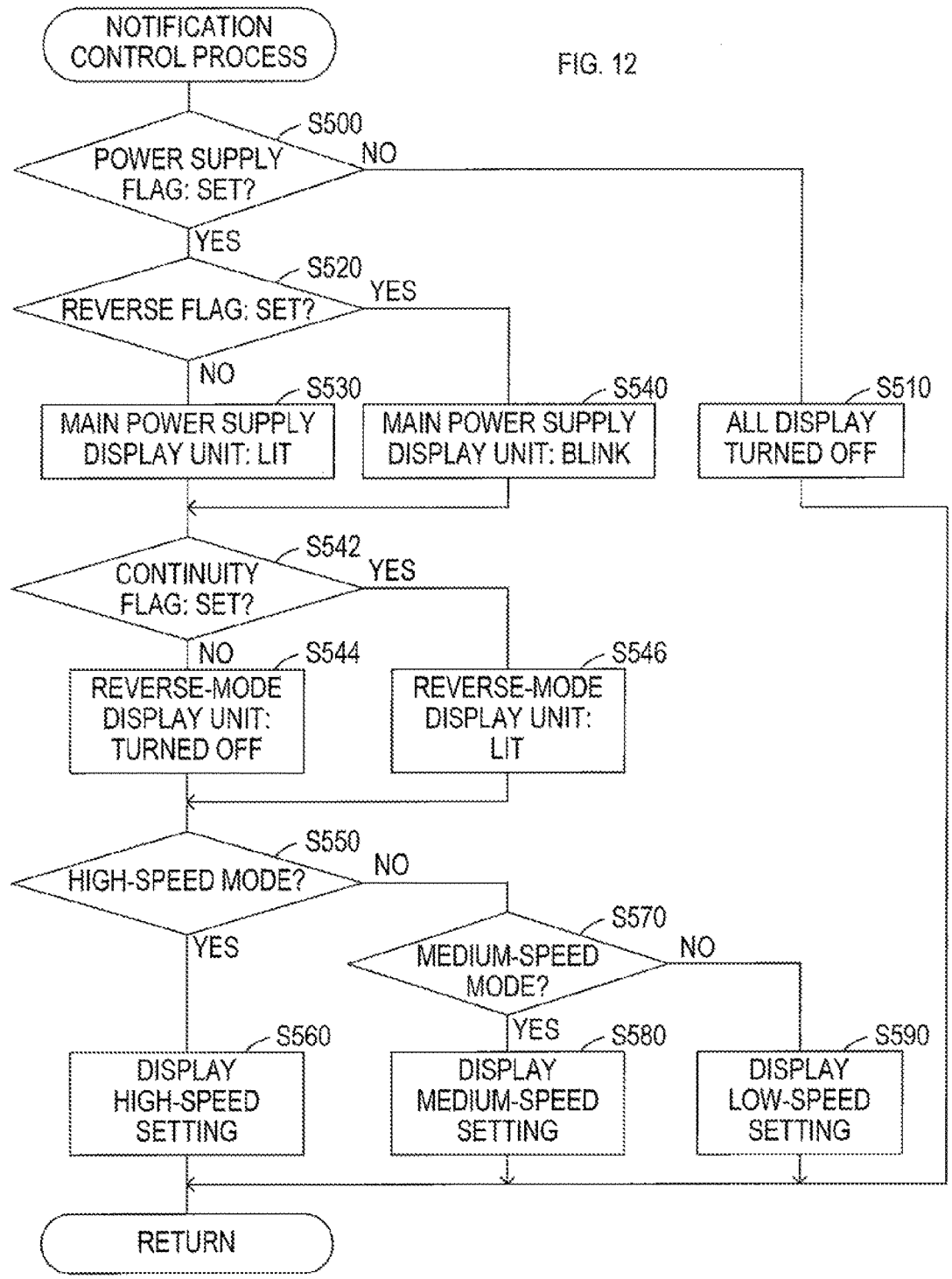
FIG. 12 is a flowchart showing a notification control process of the first modification.

Next, in the notification control process of the first modification as shown in FIG. 12, if the main power supply display unit 47 is lit or made to blink in S530 or S540, then the notification control process proceeds to S542 to determine whether the continuity flag is set.

If the continuity flag is not set, then the reverse-mode display unit 64 is turned off in S544. If the continuity flag is set, then the reverse-mode display unit 64 is lit in S546. The operation during the drive of the motor 22 in the reverse direction is notified to the user via the process in S544 or S546; the notification control process then proceeds to S550.

As a result of the above, if the reverse-mode display unit 64 is lit, then the user can acknowledge that the motor 22 can be continuously driven during the operation of the trigger switch 18 when reversely driving the motor 22. Also, if the reverse-mode display unit 64 is turned off then the user can acknowledge that the motor 22 stops automatically after the specified time has elapsed although the trigger switch 18 is operated.

Figure 13:
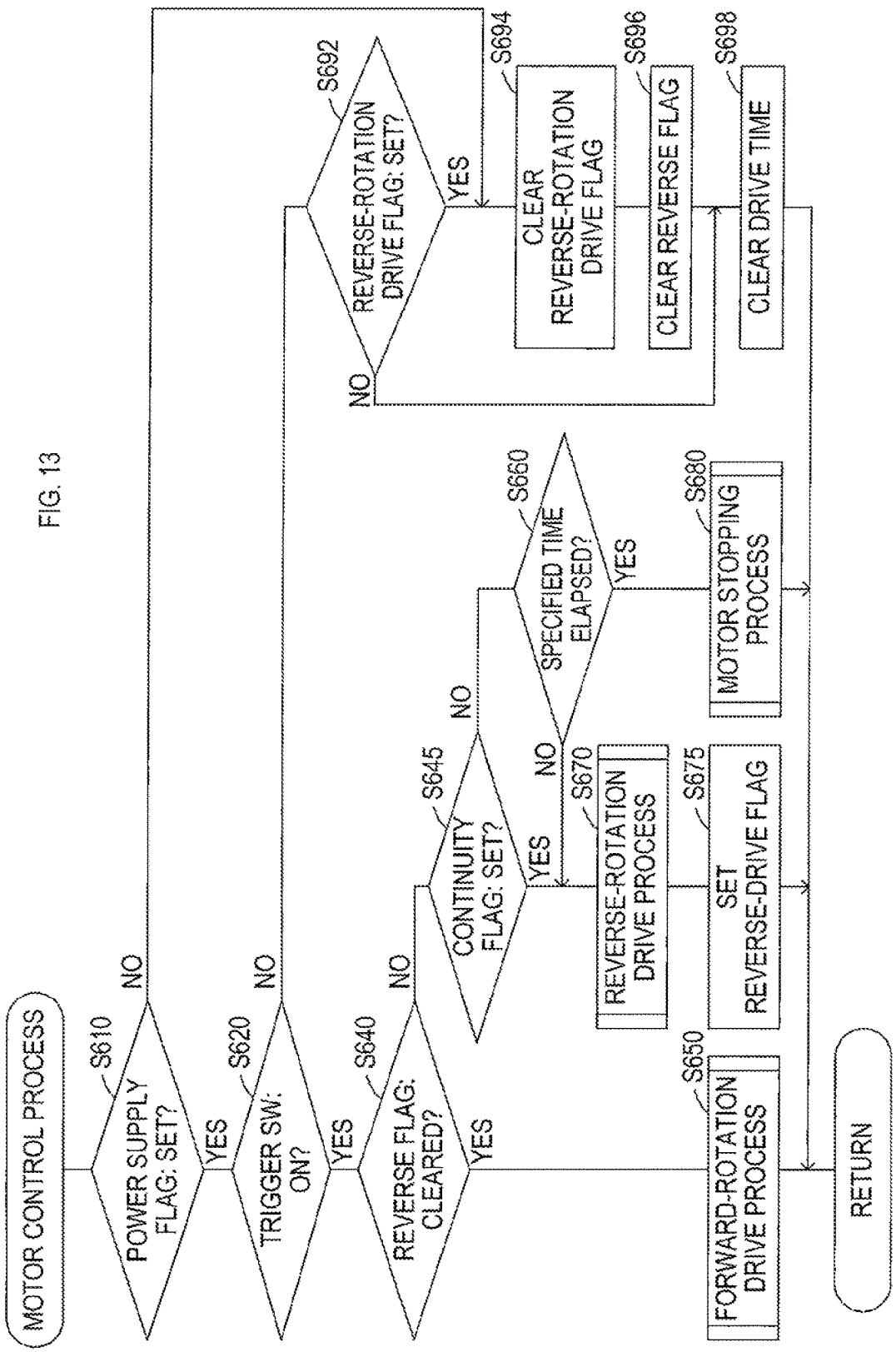
FIG. 13 is a flowchart showing a motor control process of the first modification.

Next, in the motor control process of the first modification as shown in FIG. 13, if it is determined in S640 that the reverse flag is set, then the motor control process proceeds to S645 to determine whether the continuity flag is set.

If it is determined in S645 that the continuity flag is set, then it is not required to limit the drive time of the motor 22 during a reverse drive; thus, the motor control process proceeds to S670 to execute the reverse-rotation drive process; and the motor control process is ended after a reverse-drive flag is set in the following S675.

If it is determined in S645 that the continuity flag is not set, then it is required to limit the drive time of the motor 22 during the reverse drive to the specified time or less; thus, the motor control process proceeds to S660 to determine whether the execution time for the reverse-rotation drive process has reached the specified time.

If it is determined in S660 that the execution time of the reverse-rotation drive process has not reached the specified time, then the motor control process proceeds to S670 the process steps in S670 and S675 are executed; and the motor control process is then ended.

If it is determined in S660 that the execution time of the reverse-rotation drive process has reached the specified time, then the motor stopping process is executed in S680, and the motor control process is then ended.

Next, if it is determined in S620 that the trigger switch 18 is not set in the ON state, then the motor control process proceeds to S692 to determine whether the reverse-drive flag is set.

If it is determined in S692 that the reverse-drive flag is set, or if it is determined in S610 that the power supply flag is not set, then the motor control process proceeds to S698 after the reverse-drive flag is cleared in S694 and the reverse flag is cleared in S696.

If it is determined in S692 that the reverse-drive flag is not set, then the motor control process immediately proceeds to S698.

The drive time of the motor 22 is then cleared in S698 and the motor control process is ended.

According to the first modification, depending on whether the continuity flag is set during the drive of the motor 22 in the reverse direction, switching takes place as mentioned above between driving the motor 22 continuously until the operation of the trigger switch 18 is stopped and limiting the drive time of the motor 22 to the specified time or less.

Since the operation of the reverse-mode switch 62 by the user sets or clears the continuity flag, the user may discretionally set the operation of the motor 22 during the drive in the reverse direction and thus can improve the usability of the grass mower.

Second Modification

In the first modification, the reverse-mode switch 62 is provided so as to enable the user to select whether to limit the drive time during the drive of the motor 22 in the reverse direction to the specified time or less; and the reverse-mode display unit 64 is provided so as to notify the result of such selection.

However, it is not always necessary to provide the reverse-mode switch 62 or the reverse-mode display unit 64 to switch or notify the operation mode during the drive of the motor 22 in the reverse direction; the different operation switch or a different display unit may be used.

Figure 14:
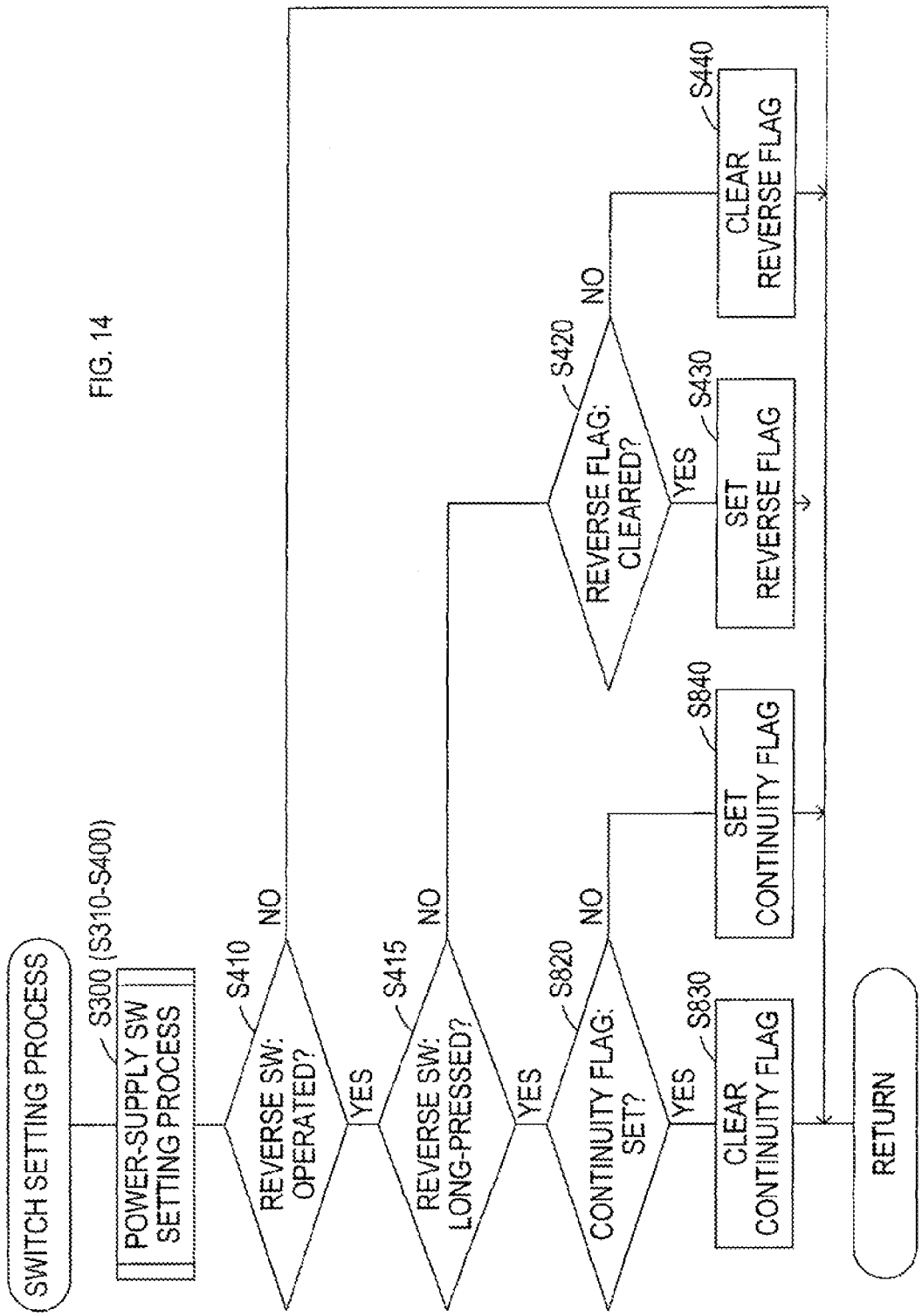
FIG. 14 is a flowchart showing a switch setting process of a second modification.
Figure 15:
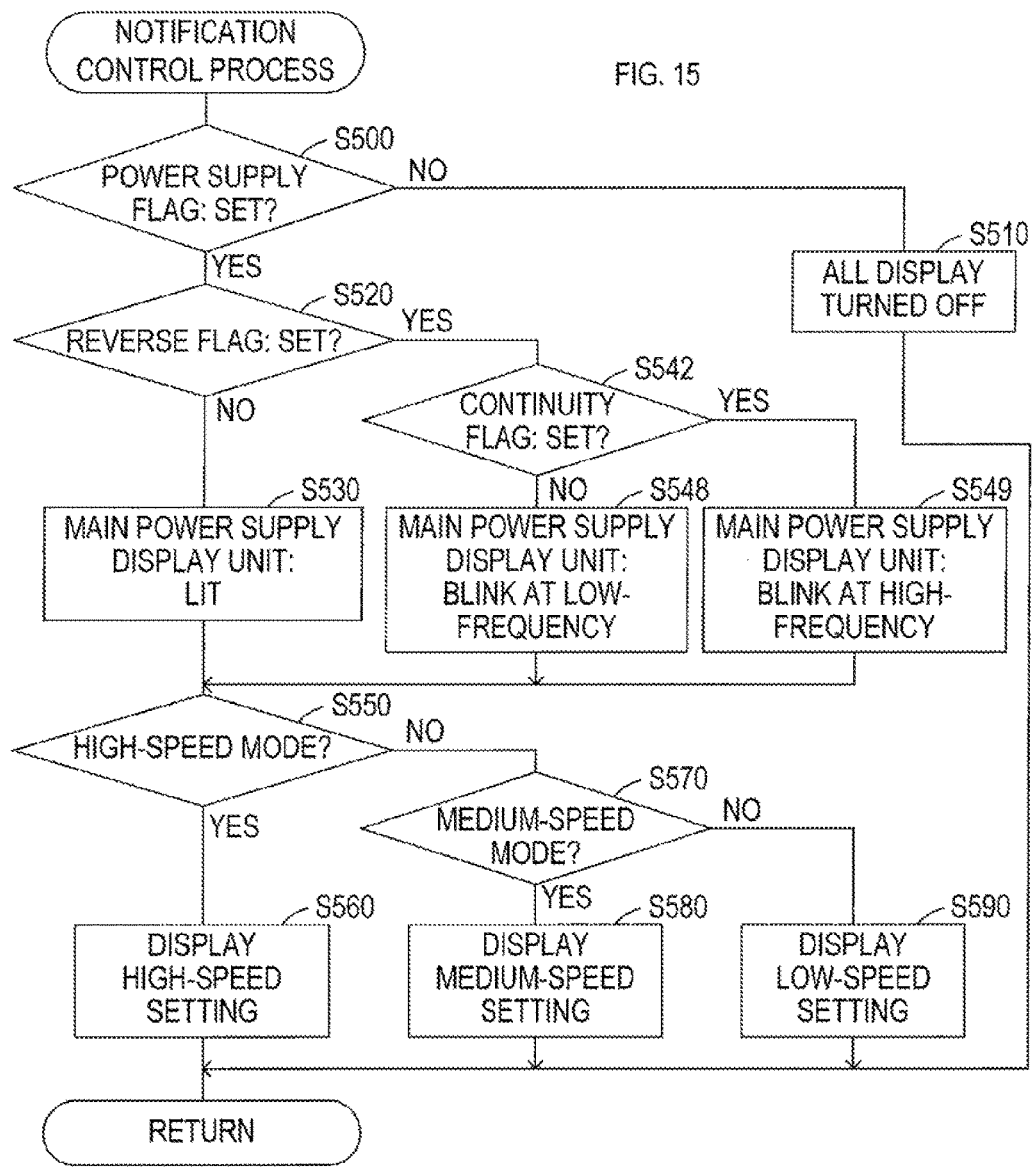
FIG. 15 is a flowchart showing a notification control process of the second modification; and, FIG. 16 is a flowchart showing a switch setting process of a third modification.

Thus, in the second modification, the switch setting process as shown in FIG. 11 is changed as exemplified in FIG. 14; and the notification control process as shown in FIG. 12 is changed as exemplified in FIG. 15. Such changes enable the circuit configuration shown in FIG. 4 to exert the same effect as the effect in the first modification.

In the switch setting process of the second modification as shown in FIG. 14, the power-supply switch setting process is executed in S300, and then the switch setting process proceeds to S410 to determine whether the reverse switch 44 is operated.

If the reverse switch 44 is not operated, then the switch setting process is ended; if the reverse switch 44 is operated, then the switch setting process proceeds to S415.

It is determined in S415 whether an operated time of the reverse switch 44 is equal to the specified time or more (in other words, whether the reverse switch 44 is long-pressed).

If it is determined in S415 that the reverse switch 44 is long-pressed, then process steps from S820 to S840 are executed; if it is determined in S415 that the reverse switch 44 is not long-pressed, then process steps from S420 to S440 are executed.

That is to say that when the reverse switch 44 is operated in the second modification, and if such operation is a long-press, then the state of the continuity flag is reversed in the process steps from S820 to S840; if such operation is not a long-press, then the state of the reverse flag is reversed in the process steps from S420 to S440.

Thus, in the second modification, the reverse switch 44 may also function as the reverse-mode switch 62 of the first modification; and the user can switch the state of the continuity flag (in other words, whether to limit the drive time during the drive of the motor 22 in the reverse direction) without using the reverse-mode switch 62.

In the notification control process of the second modification, as shown in FIG. 15, the notification control process proceeds to S542 to determine whether the continuity flag is set when it is determined in S520 that the reverse flag is set.

If the continuity flag is not set, then the main power supply display unit 47 is made to blink at a low-frequency in S548; if the continuity flag is set, then the main power supply display unit 47 is made to blink at a high-frequency in S549.

After the main power supply display unit 47 is made to blink at a low-frequency or a high-frequency in S548 or S549, the notification control process proceeds to S550 to execute process steps from S550 to S590 that display, on the speed display unit 48, the drive speed during the drive of the motor 22 in the forward direction.

As mentioned above, in the second modification, at the same time as it is notified that the drive direction of the motor 22 is set to the reverse direction by making the main power supply display unit 47 blink, it is also notified whether to limit the drive time of the motor 22 during the drive in the reverse direction by making the main power supply display unit 47 blink at a high-frequency or a low-frequency.

According to this second modification, it can thus be notified whether to limit the drive time of the motor 22 during the drive in the reverse direction without disposing the reverse-mode display unit 64.

Note that in the second modification, the reverse switch 44 is used to accomplish the function as the reverse-mode switch 62, and the main power supply display unit 47 is used to accomplish the function as the reverse-mode display unit 64; however, such function may also be accomplished by using another operation switch or another display unit.

The function of one of the reverse-mode switch 62 or the reverse-mode display unit 64 may be accomplished by using another operation switch or another display unit; and the function of the other may be accomplished by disposing a switch or a display unit for an exclusive use.

Third Modification

When the reverse switch 44 is operated in the switch setting process of the second modification, it is determined whether such an operation is a long-press. If such an operation is a long-press, then the state of the continuity flag is reversed; if such an operation is not a long-press, then the state of the reverse flag is reversed.

Figure 16:
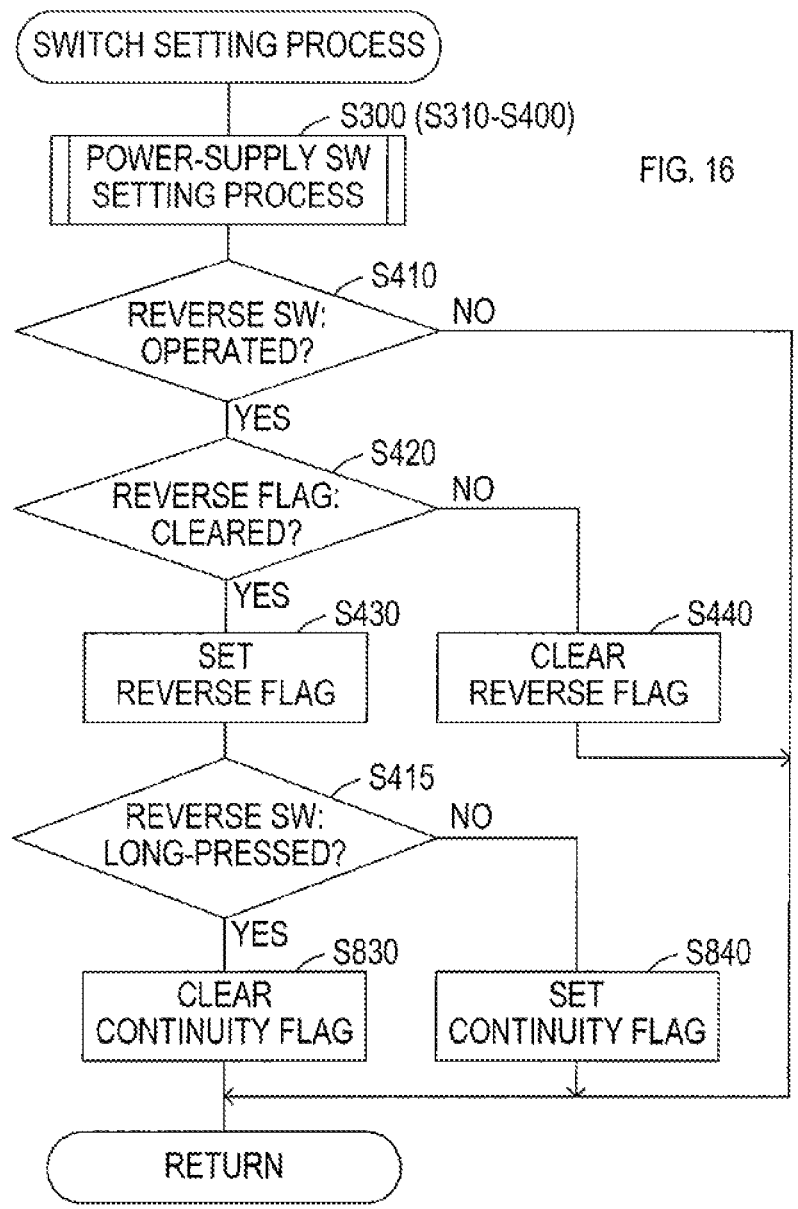

Contrastingly, the switch setting process of the third modification is executed in accordance with the flowchart shown in FIG. 16.

That is to say that, in the switch setting process of the third modification, the switch setting process proceeds to S410 to determine whether the reverse switch 44 is operated as shown in FIG. 16 after the power-supply switch setting process is executed in S300.

If the reverse switch 44 is not operated, then the switch setting process is ended. If the reverse switch 44 is operated, the switch setting process proceeds to S420 to determine whether the reverse flag is cleared; if the reverse flag is not cleared, then the switch setting process is ended after the reverse flag is cleared in S440.

Meanwhile, if it is determined in S420 that the reverse flag is cleared, then the reverse flag is set in S430; and the switch setting process proceeds to S415 to determine whether the operated time of the reverse switch 44 is equal to the specified time or more (in other words, whether the reverse switch 44 is long-pressed).

If it is determined in S415 that the reverse switch 44 is long-pressed, then the continuity flag is cleared in S830 and the switch setting process is ended.

If it is determined in S415 that the reverse switch 44 is not long-pressed, then the continuity flag is set in S840 and the switch setting process is ended.

In the third modification, the state of the reverse flag is thus reversed when the reverse switch 44 is operated regardless of the operated time of the reverse switch 44.

When the reverse flag is set by such a reverse operation, it is determined whether the operated time of the reverse switch 44 is long (in other words, whether the operation of the reverse switch 44 is a long-press). If it is a long-press, then the continuity flag is cleared; if it is not a long-press, then the continuity flag is set. The operation during the drive of the motor 22 in the reverse direction is set in accordance with the state of the continuity flag.

Thus, in the third modification, a mere single operation of the reverse switch 44 is capable of setting the drive of the motor 22 in the reverse direction and setting whether to limit the drive time during the reverse drive of the motor 22 to the specified time or less. Therefore, according to the third modification, operation for such settings during the reverse drive of the motor 22 can be made easy compared with that of the second modification.

Other Modification

In the aforementioned embodiment, the first modification, the second modification, and the third modification, commands to input is switched by the operated time (long-pressed/short-pressed) of the power-supply switch 43 or the reverse switch 44 so as to enable the power-supply switch 43 or the reverse switch 44 to function as the dual-operation unit that inputs a plurality of commands. However, such operation method of the dual-operation unit is merely an example; commands to input may be changed by a preset operational condition such as the operated time and the number of times of operation of the switch.

It is explained in the aforementioned embodiment that the reverse switch 44 is a push button switch that sets in the ON state when depressed; however, the reverse switch 44 may be, for example, a slide switch or a switch that is capable of self-holding the ON or OFF state of the contacts.

In the aforementioned embodiment, an example of applying the present disclosure to a rechargeable grass mower that operates by receiving electric power supply from battery packs is explained. However, as applied to the aforementioned embodiment, the present disclosure may likewise be applied to any motor-powered apparatus, such as an electric power tool, that comprises a motor.

Also, as applied to the aforementioned embodiment, the present disclosure may nevertheless likewise be applied to a rechargeable motor-powered apparatus that receives electric power supply from a battery pack, or to a motor-powered apparatus that receives alternating-current power from a commercial power source.

What is claimed is:

1. A motor-powered apparatus comprising:
a motor;
a drive switch that is configured to input a drive command for the motor;
a reverse switch that is configured to input a reverse command that switches a rotational direction of the motor from a forward direction to a reverse direction, the reverse direction being a rotational direction opposite to the forward direction; and
a control unit that is configured to
drive the motor in the reverse direction without driving the motor in the forward direction when the drive command is inputted via the drive switch after the reverse command is inputted via the reverse switch,
set the rotational direction of the motor in the forward direction when the input of the drive command is stopped, and
drive the motor in the forward direction without driving the motor in the reverse direction when the drive command is inputted again via the drive switch without the input of the reverse command.

2. The motor-powered apparatus according to claim 1, wherein the control unit is configured to limit a drive time of the motor during a drive of the motor in the reverse direction to be equal to or less than a predefined set time, the drive of the motor in the reverse direction taking place when the drive command is inputted via the drive switch after the reverse command is inputted via the reverse switch.

3. The motor-powered apparatus according to claim 1, wherein the control unit is configured to drive the motor in the reverse direction, when the drive command is inputted via the drive switch after the reverse command is inputted via the reverse switch, until the input of the drive command via the drive switch is stopped.

4. The motor-powered apparatus according to claim 1, wherein the control unit is configured to set a drive speed during a drive of the motor in the reverse direction equal to or less than a drive speed during a drive of the motor in the forward direction.

5. The motor-powered apparatus according to claim 1, wherein the control unit is configured to selectively execute one of (i) a first function and (ii) a second function in accordance with a select command inputted from outside of the motor-powered apparatus,
wherein the first function is a function that limits a drive time during a drive of the motor in the reverse direction to be equal to or less than a predefined set time, the drive of the motor in the reverse direction taking place when the drive command is inputted via the drive switch after the reverse command is inputted via the reverse switch; and,
wherein the second function is a function that drives the motor in the reverse direction, when the drive command is inputted via the drive switch after the reverse command is inputted via the reverse switch, until the input of the drive command via the drive switch is stopped.

6. The motor-powered apparatus according to claim 5 comprising a given switch,
wherein the control unit is configured to switch between the first function and the second function when the given switch is operated continuously for a set time or longer.

7. The motor-powered apparatus according to claim 6, wherein the given switch is the reverse switch.

8. The motor-powered apparatus according to claim 1 comprising an operation panel comprising the reverse switch and a different switch that comprises an operation portion, and,
wherein the reverse switch comprises a smaller operation portion than the operation portion of the different switch.

9. The motor-powered apparatus according to claim 8 comprising a grip portion that is configured to be held by a user of the motor-powered apparatus, and,
wherein the operation portion of the reverse switch is disposed at a location where the user can operate the operation portion while holding the grip portion and is arranged at a location more distant from the grip portion than a location of the operation portion of the different operation switch.

10. The motor-powered apparatus according to claim 8, wherein the different operation switch is configured to set a drive speed of the motor.

11. The motor-powered apparatus according to claim 9, wherein the different operation switch is configured to set a drive speed of the motor.

12. A method of controlling a motor-powered apparatus that comprises a motor; a drive switch that is configured to input a drive command for the motor; and a reverse switch that is configured to input a reverse command to switch a rotational direction of the motor from a forward direction to a reverse direction, the reverse direction being a rotational direction opposite to the forward direction, the method comprising:

detecting that the reverse command is inputted via the reverse switch;

detecting that the drive command is inputted via the drive switch after detecting that the reverse command is inputted via the reverse switch;

driving the motor in the reverse direction without driving the motor in the forward direction when detecting that the drive command is inputted via the drive switch after the reverse command is inputted;

setting the rotational direction of the motor in the forward direction when the input of the drive command is stopped;

detecting that the drive command is inputted again via the drive switch after the input of the drive command is stopped; and driving the motor in the forward direction when detecting that the drive command is inputted again via the drive switch without the input of the reverse command.

13. The motor-powered apparatus according to claim 1, wherein the motor-powered apparatus is a grass mover.

14. The method according to claim 12, wherein the motor-powered apparatus is a grass mover.

* * * * *